(12) United States Patent
Zaveri et al.

(10) Patent No.: US 10,339,132 B2
(45) Date of Patent: Jul. 2, 2019

(54) FLOW CONTROL TECHNIQUE FOR EOS SYSTEM

(71) Applicant: NetApp, Inc., Sunnyvale, CA (US)

(72) Inventors: Pinkesh Zaveri, Menlo Park, CA (US); Mandar Naik, San Jose, CA (US); Edward D. McClanahan, Danville, CA (US)

(73) Assignee: NetApp, Inc., Sunnyvale, CA (US)

( * ) Notice: Subject to any disclaimer, the term of this patent is extended or adjusted under 35 U.S.C. 154(b) by 433 days.

(21) Appl. No.: 14/795,066

(22) Filed: Jul. 9, 2015

(65) Prior Publication Data

US 2017/0011062 A1    Jan. 12, 2017

(51) Int. Cl.
G06F 16/23    (2019.01)

(52) U.S. Cl.
CPC ...... *G06F 16/2379* (2019.01); *G06F 16/2358* (2019.01)

(58) Field of Classification Search
CPC ......... G06F 17/30368; G06F 17/30377; G06F 17/30371; G06F 9/466; G06F 11/1471; G06F 11/1474; G06F 16/2379; G06F 16/2358
See application file for complete search history.

(56) References Cited

U.S. PATENT DOCUMENTS

| | | | | |
|---|---|---|---|---|
| 5,734,898 A | * | 3/1998 | He | G06F 9/52 |
| 5,890,161 A | * | 3/1999 | Helland | G06Q 10/02 |
| 6,553,384 B1 | * | 4/2003 | Frey | G06F 9/548 |
| 7,624,112 B2 | * | 11/2009 | Ganesh | G06F 9/466 |
| 8,996,535 B1 | | 3/2015 | Kimmel et al. | |
| 2004/0158549 A1 | * | 8/2004 | Matena | G06F 11/2097 |
| 2004/0186858 A1 | * | 9/2004 | McGovern | G06F 17/30188 |
| 2004/0267932 A1 | * | 12/2004 | Voellm | G06F 9/5011 709/226 |
| 2007/0016617 A1 | * | 1/2007 | Lomet | G06F 11/1482 |
| 2009/0307290 A1 | * | 12/2009 | Barsness | G06F 17/30575 |
| 2012/0331471 A1 | * | 12/2012 | Ramalingam | G06F 11/1474 718/102 |

(Continued)

*Primary Examiner* — Marc S Somers
(74) *Attorney, Agent, or Firm* — Cesari and McKenna, LLP

(57) ABSTRACT

A flow control technique prevents exhaustion of storage resources in an exactly once semantics (EOS) system of a storage input/output stack executing on a node of a cluster. An EOS server may service transactions sent by an EOS client and issue replies with results to the EOS client. In order to replay the transactions during normal operation after recovery from a crash, the EOS server persistently stores the transactions in the storage resources until an acknowledgement of completion is received from the EOS client for each pending transaction. The EOS client may issue a checkpoint acknowledgement, e.g., as a prune record, after a periodic interval that marks the completion of all pending transactions issued prior to the record. The EOS server need only log the prune record (rather than each pending transaction) to thereby prevent exhaustion of the storage resources, while also minimizing logging overhead of the server. In response to the crash and during replay of the transactions, the EOS server may employ the prune records to ignore those transactions that have already been acknowledged by the EOS client, thereby reducing time required for replay of the transactions.

20 Claims, 15 Drawing Sheets

(56) References Cited

U.S. PATENT DOCUMENTS

2013/0148504 A1* 6/2013 Ungureanu ............. H04L 47/17
370/235
2015/0199415 A1* 7/2015 Bourbonnais ..... G06F 17/30578
707/615
2015/0288671 A1* 10/2015 Chan ................... H04L 63/0227
726/1

* cited by examiner

FLOW CONTROL TECHNIQUE FOR EOS SYSTEM

BACKGROUND

Technical Field

The present disclosure relates to storage systems and, more specifically, to flow control in an exactly once semantics (EOS) system of a storage system.

Background Information

A storage system typically includes one or more storage devices, such as disks embodied as hard disk drives (HDDs) or solid state drives (SSDs), into which data may be entered, and from which data may be obtained, as desired. The storage system may implement a high-level module, such as a file system, to logically organize the data stored on the disks as storage containers, such as files or logical units (LUNs). Each storage container may be implemented as a set of data structures, such as data blocks that store data for the storage containers and metadata blocks that describe the data of the storage containers. The storage system may also be configured for de-duplication of data to reduce an amount of storage capacity consumed by previously stored data.

It is desirable for a storage system to be idempotent, such that if an operation is performed more than once, the result is the same (e.g., in terms of write and/or read operations). In other words, idempotent operations may be applied multiple times in the storage system without changing the result beyond the initially applied operation. Such idempotent operations may be advantageous because, e.g., if data is written to a disk and the writer (client) is unsure whether the write operation was successful, the operation can be issued again without unintended consequences. In addition, the use of idempotent operations in the storage system helps to prevent data loss by avoiding deletion of data before it is needed, while also ignoring stale copies of the data.

However, certain operations such as, e.g., an operation to increment a reference count for data stored in the storage system, are not idempotent. To ensure that such non-idempotent operations occur exactly once in the storage system, the non-idempotent operations may be recorded (logged) on storage resources) of the storage system until completion of the operations is acknowledged. Such logging of non-idempotent operations increases storage consumption and/or exhaustion, as well as time consumed when replaying the operations during recovery after a crash of the storage system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments herein provide a flow control technique that prevents exhaustion of storage resources in an exactly once semantics (EOS) system of a storage input/output (I/O) stack executing on a node of a cluster. A first layer (e.g., a volume layer instance) of the storage I/O stack may act as an EOS client issuing non-idempotent operations to a second layer (e.g., an extent store layer instance) of the stack, which may act as an EOS server. The EOS client may wrap (i.e., encapsulate) the non-idempotent operations within the transactions embodied as EOS transaction data structures, each having a transaction identifier (ID) that uniquely identifies the transaction. The EOS server may service the transactions and issue replies with results to the EOS client. In order to replay the transactions exactly once during recovery from a crash, the EOS server, during normal operation, persistently stores (i.e., logs) the transactions (including the transaction ID) in the storage resources until an acknowledgement of completion is received from the EOS client for each pending transaction. Similarly, the EOS client, during normal operation, also logs the acknowledgement of completion by the EOS server for each transaction, thereby enabling replay of those acknowledgements after a crash.

According to the flow control technique, the EOS client may issue an acknowledgement for a group of transactions as a "checkpoint" after a periodic interval, i.e., a checkpoint acknowledgement, that marks the completion of all pending transactions issued prior to the acknowledgement. In this manner, prior logged transactions that are checkpoint acknowledged may be pruned (e.g., reclaimed) from the storage resources. As such, the EOS server need only log a prune record (rather than a separate acknowledgement for each completed transaction) to reduce consumption of storage resources, thereby preventing exhaustion of those storage resources, while also minimizing logging overhead of the server. Moreover, in response to the crash and during replay of the transactions, the EOS server may employ the prune records to ignore those transactions that have already been acknowledged by the EOS client, thereby reducing time required for replay of the transactions.

DESCRIPTION

Storage Cluster

Figure 1:
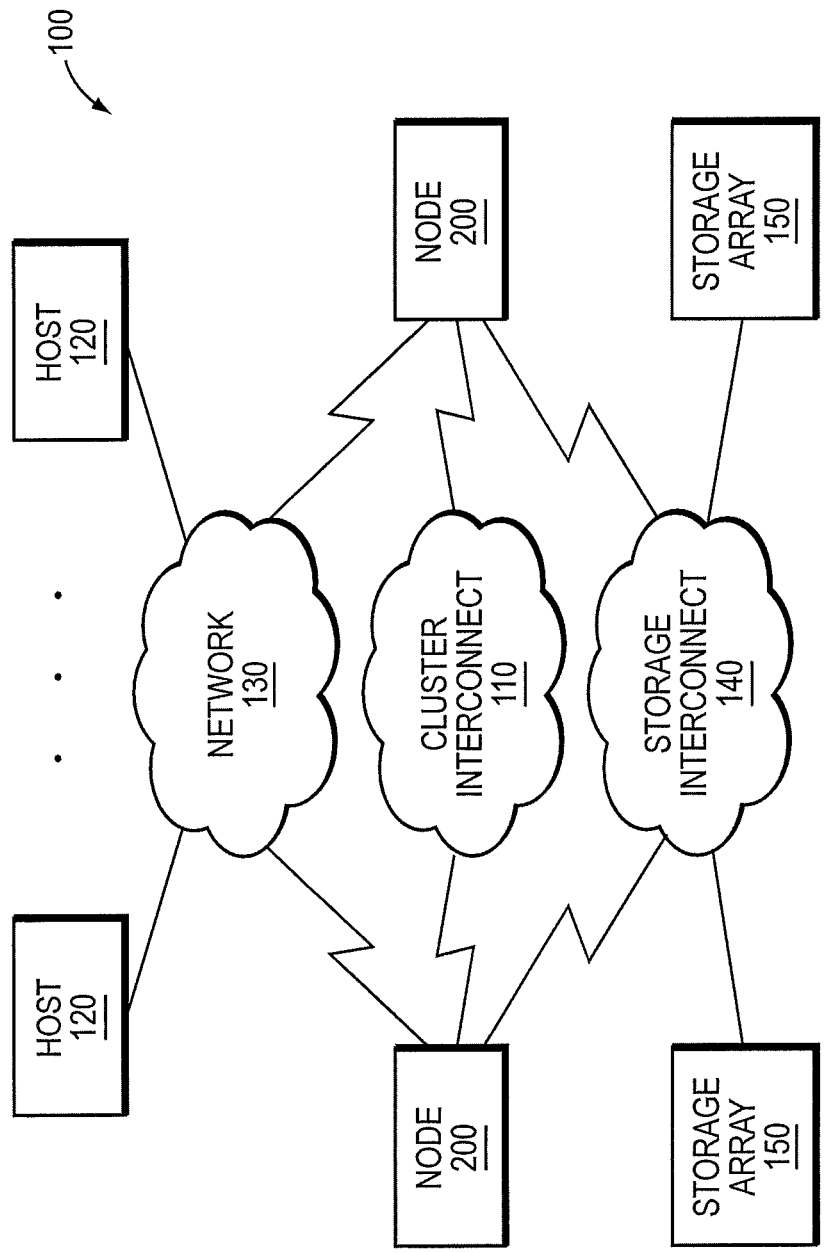
FIG. 1 is a block diagram of a plurality of nodes interconnected as a cluster.

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
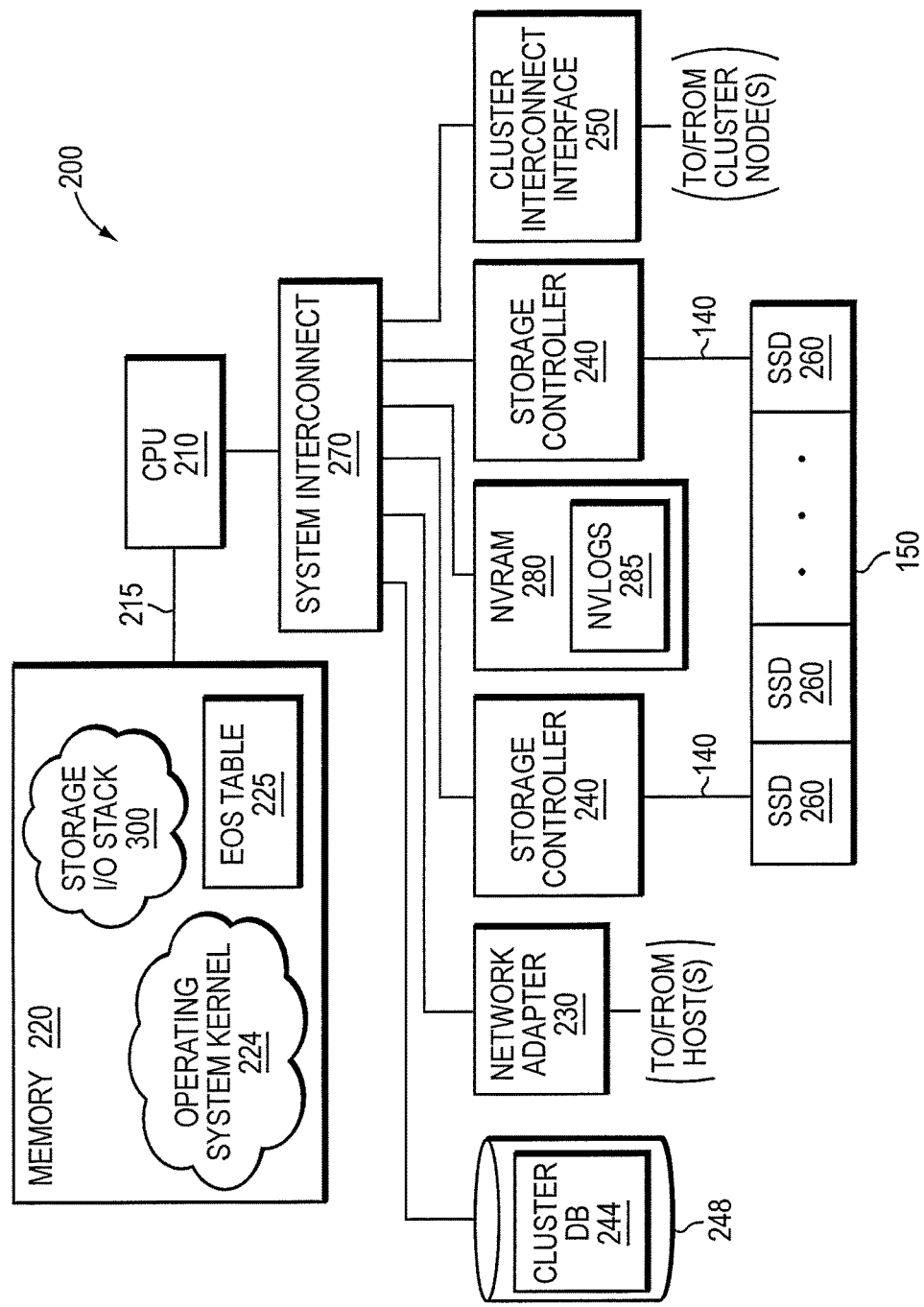
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures, such an exactly once semantics (EOS) table 225. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
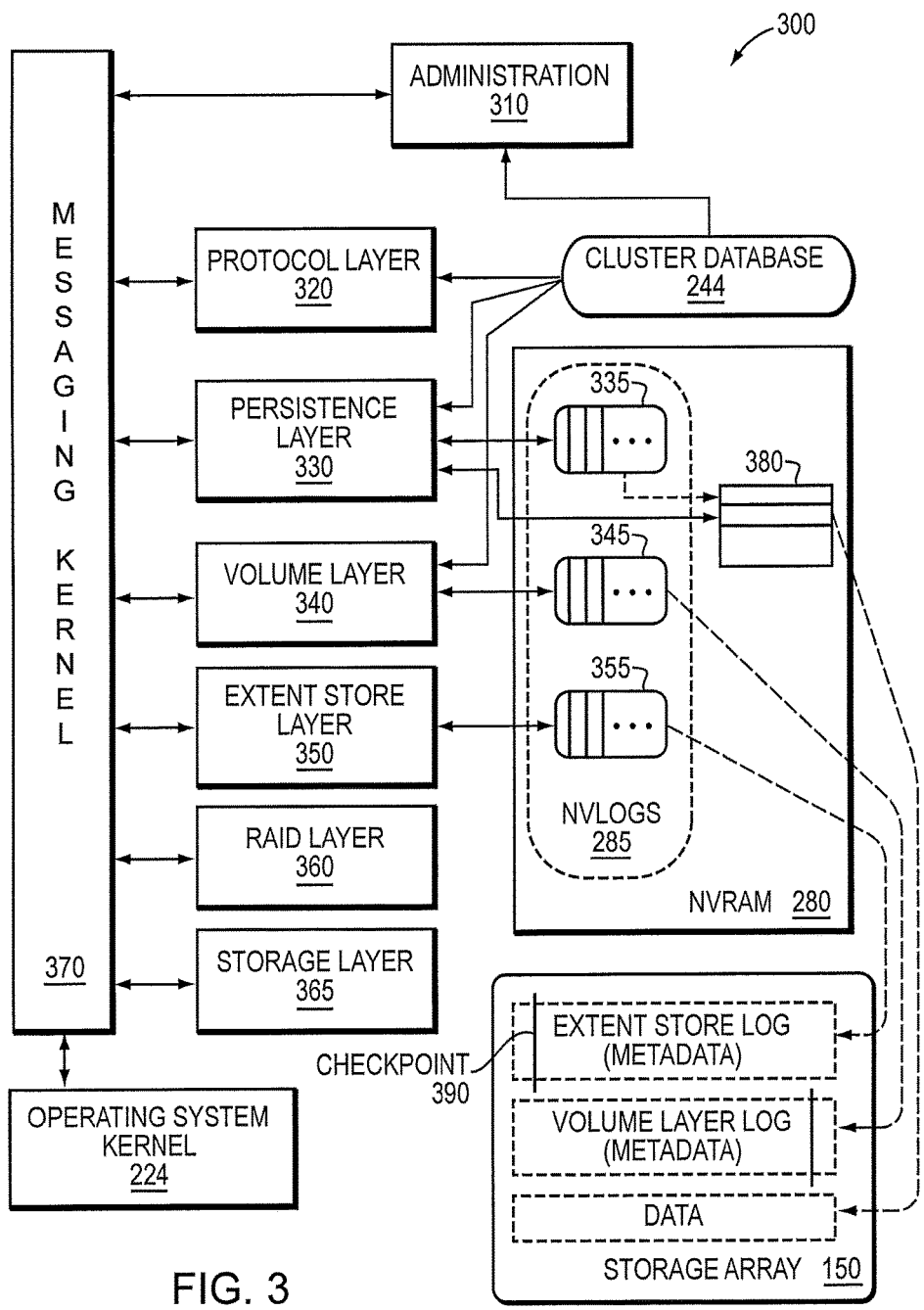
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
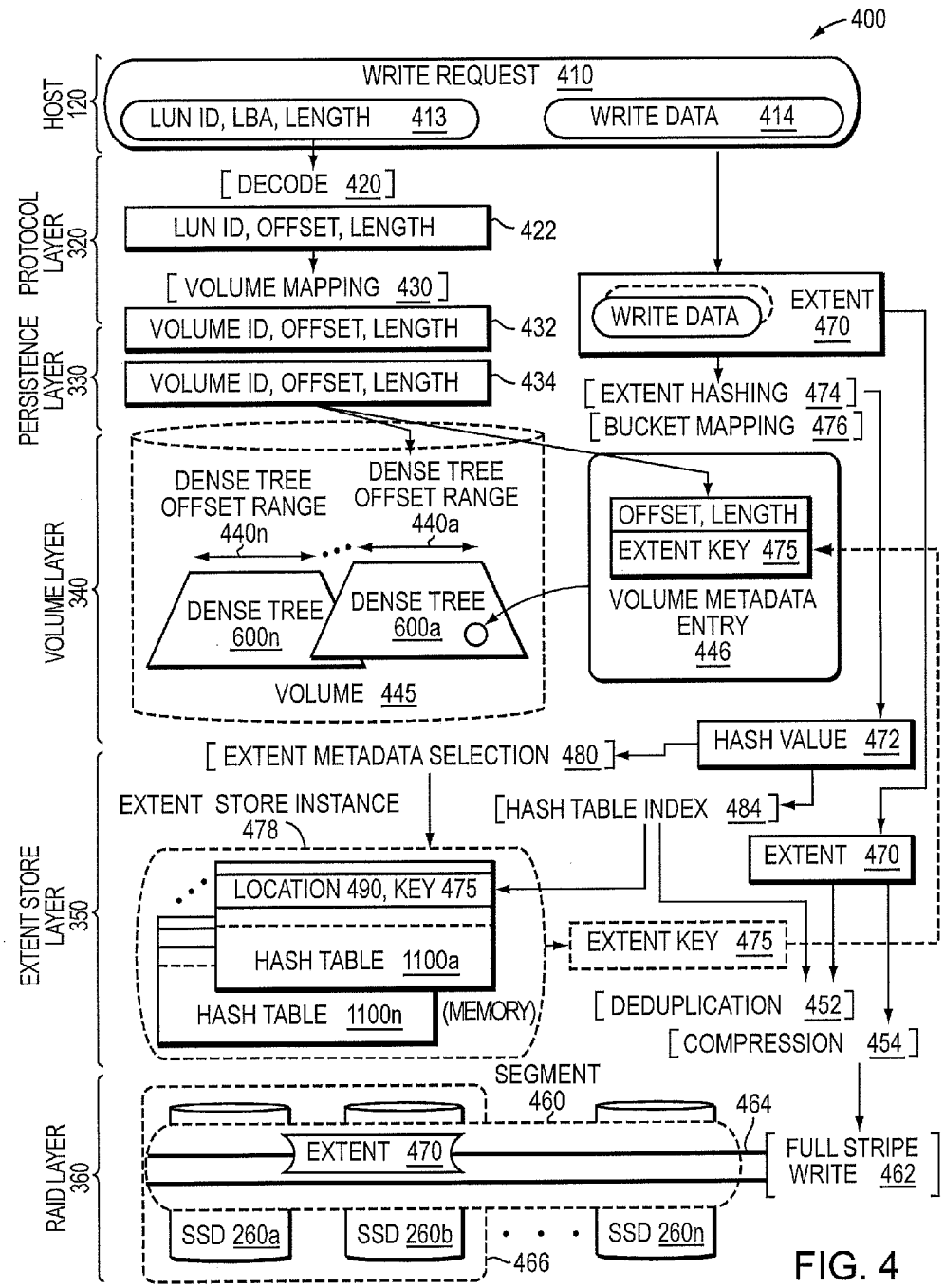
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication. Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 1100 (e.g., hash table 1100a) from a set of hash tables (illustratively in-core) within the extent store instance 478, and (ii) extracts a hash table index 484 from the hash value 472 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the extent metadata selection technique 480. If a table entry with a matching extent key is found, then the SSD location 490 mapped from the extent key 475 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 475 of the existing extent is passed to the appropriate volume layer instance for storage within an entry (denoted as volume metadata entry 446) of a dense tree metadata structure (e.g., dense tree 600*a*), such that the extent key 475 is associated an offset range 440 (e.g., offset range 440*a*) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 1100*n*) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260*b* for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 1100*n* (i.e., as selected by the new candidate extent key), (ii) passes a new extent key (denoted as extent key 475) to the appropriate volume layer instance for storage within an entry (also denoted as volume metadata entry 446) of a dense tree 600 managed by that volume layer instance, and (iii) records a change to extent metadata of the selected hash table in the extent store layer log 355. Illustratively, the volume layer instance selects dense tree 600*a* spanning an offset range 440*a* of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 600. The volume layer instance then inserts the volume metadata entry 446 into the dense tree 600*a* and records a change corresponding to the volume metadata entry in the volume layer log 345. Accordingly, the I/O (write) request is sufficiently stored on SSD 260 of the cluster.

Read Path

Figure 5:
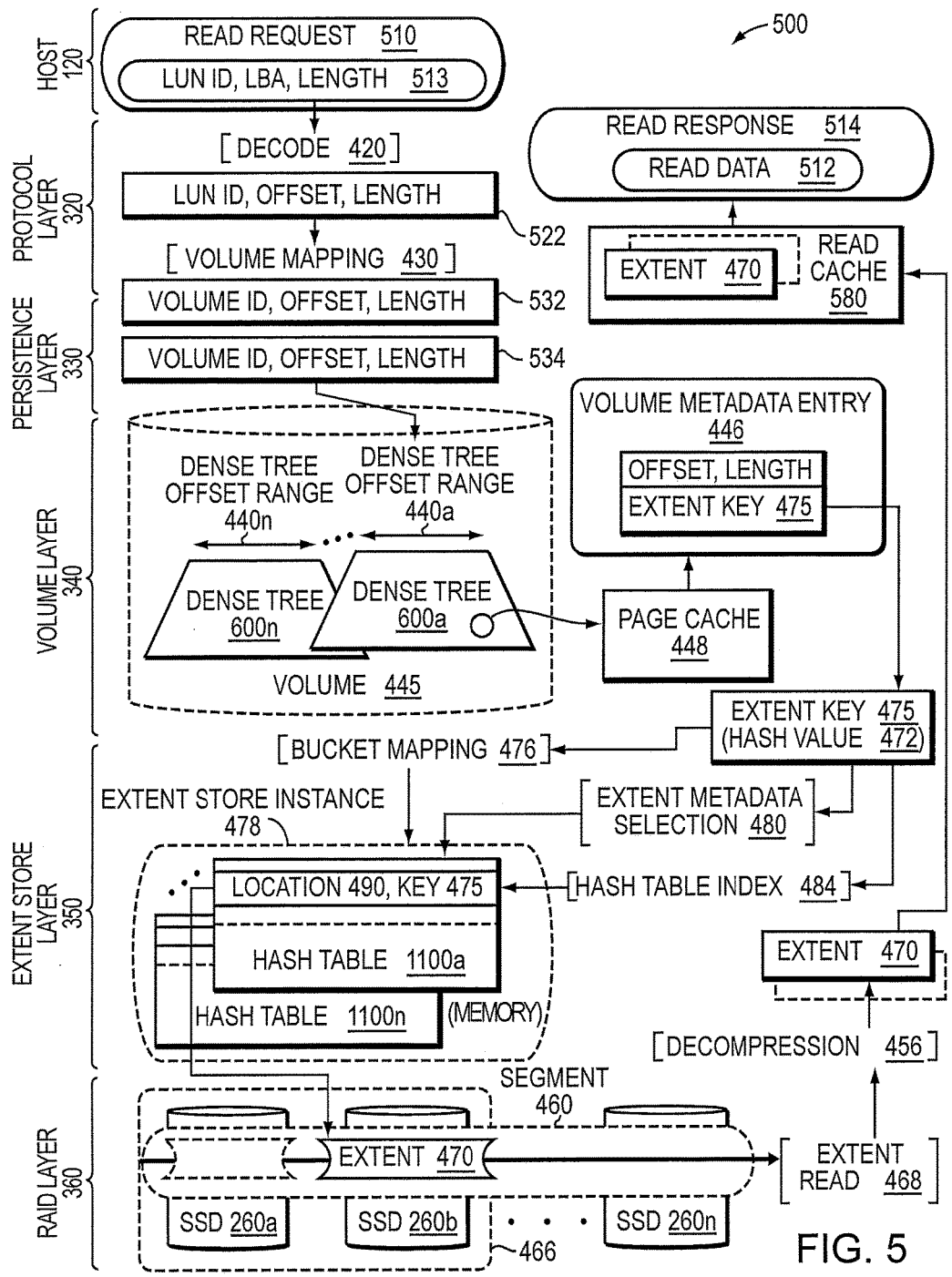
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 600*a*) associated with a region (e.g., offset range 440*a*) of a volume 445 that encompasses the requested offset range (specified by parameters 534). The volume layer instance may further process the read request to search for (lookup) one or more volume metadata entries 446 of the dense tree 600*a* to obtain one or more extent keys 475 associated with one or more extents 470 within the requested offset range. As described further herein, each dense tree 600 may be embodied as a multiple levels of a search structure with possibly overlapping offset range entries at each level. The entries, i.e., volume metadata entries 446, provide mappings from host-accessible LUN addresses, i.e., LBAs, to durable extent keys. The various levels of the dense tree may have volume metadata entries 446 for the same offset, in which case the higher level has the newer entry and is used to service the read request. A top level of the dense tree 600 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled.

Once found, each extent key 475 is processed by the volume layer 340 to, e.g., implement the bucket mapping technique 476 that translates the extent key to an appropriate extent store instance 478 responsible for storing the requested extent 470. Note that, in an embodiment, each extent key 475 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 475 may be derived from the hash value 472. The volume layer 340 may then pass the extent key 475 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 480 that (i) selects an appropriate hash table (e.g., hash table 1100*a*) from a set of hash tables within the extent store instance 478, and (ii) extracts a hash table index 484 from the extent key 475 (i.e., hash value 472) to index into the selected hash table and lookup a table entry having a matching extent key 475 that identifies a storage location 490 on SSD 260 for the extent 470. That is, the SSD location 490 mapped to the extent key 475 may be used to retrieve the existing extent (denoted as extent 470) from SSD 260 (e.g., SSD 260*b*). The extent store instance then cooperates with the RAID storage layer 360 to access the extent on SSD 260*b* and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 446) as a data structure, i.e., a dense tree metadata structure (dense tree 600), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
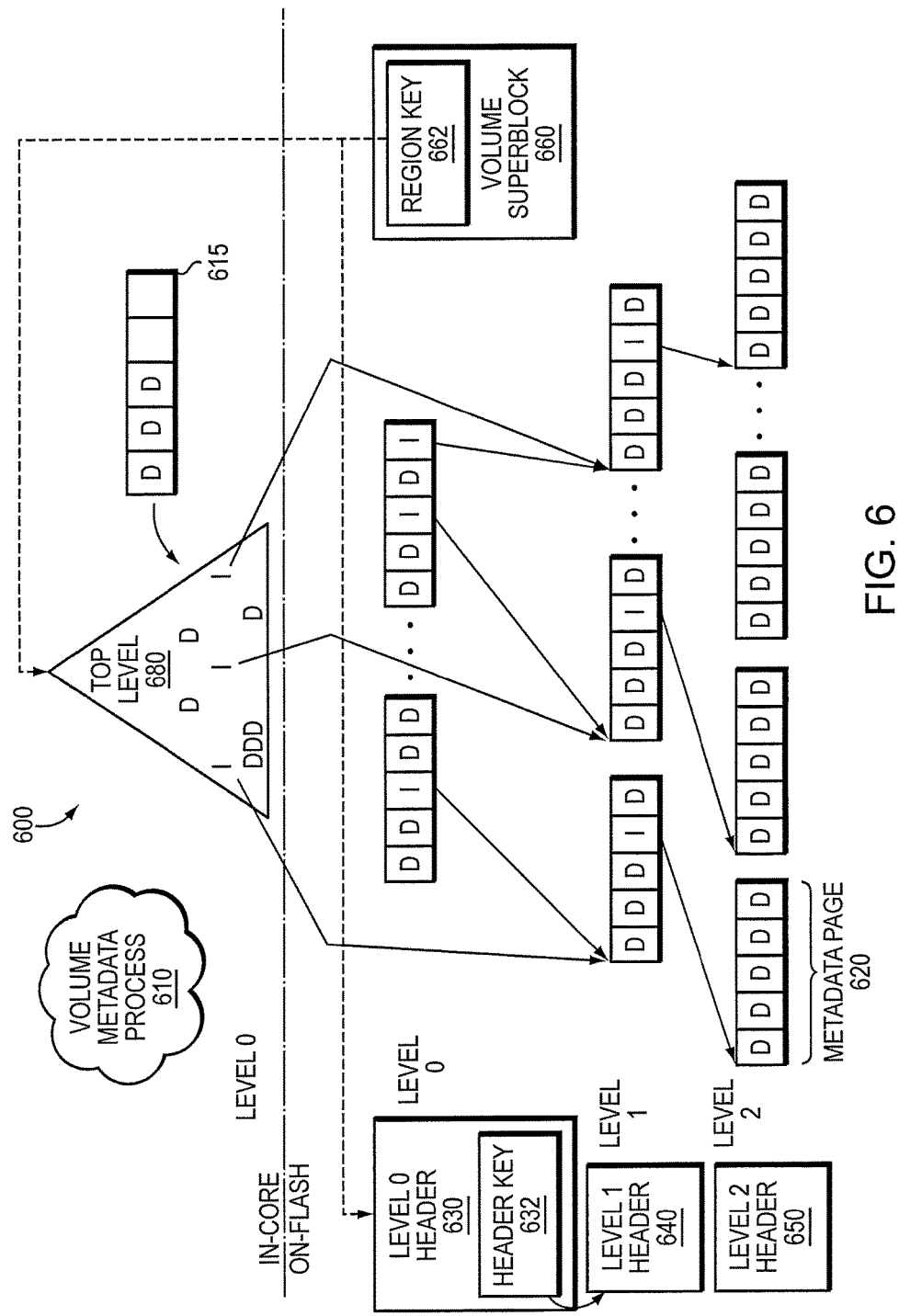
FIG. 6 is a block diagram of a dense tree metadata structure.

FIG. 6 is a block diagram of the dense tree metadata structure that may be advantageously used with one or more embodiments described herein. The dense tree metadata structure 600 is configured to provide mappings of logical offsets within a LUN (or volume) to extent keys managed by one or more extent store instances. Illustratively, the dense tree metadata structure is organized as a multi-level dense tree 600, where a top level 680 represents recent volume metadata changes and subsequent descending levels represent older changes. Specifically, a higher level of the dense tree 600 is updated first and, when that level fills, an adjacent lower level is updated, e.g., via a merge operation. A latest version of the changes may be searched starting at the top level of the dense tree and working down to the descending levels. Each level of the dense tree 600 includes fixed size records or entries, i.e., volume metadata entries 446, for storing the volume metadata. A volume metadata process 610 illustratively maintains the top level 680 of the dense tree in memory (in-core) as a balanced tree that enables indexing by offsets. The volume metadata process 610 also maintains a fixed sized (e.g., 4 KB) in-core buffer as a staging area (i.e., an in-core staging buffer 615) for volume metadata entries 446 inserted into the balanced tree (i.e., top level 680). Each level of the dense tree is further maintained on-flash as a packed array of volume metadata entries, wherein the entries are stored as extents illustratively organized as fixed sized (e.g., 4 KB) metadata pages 620. Notably, the staging buffer 615 is de-staged to SSD upon a trigger, e.g., the staging buffer is full. Each metadata page 620 has a unique identifier (ID), which guarantees that no two metadata pages can have the same content. Illustratively, metadata may not be de-duplicated by the extent store layer 350.

In an embodiment, the multi-level dense tree 600 includes three (3) levels, although it will be apparent to those skilled in the art that additional levels N of the dense tree may be included depending on parameters (e.g., size) of the dense tree configuration. Illustratively, the top level 680 of the tree is maintained in-core as level 0 and the lower levels are maintained on-flash as levels 1 and 2. In addition, copies of the volume metadata entries 446 stored in staging buffer 615 may also be maintained on-flash as, e.g., a level 0 linked list. A leaf level, e.g., level 2, of the dense tree contains data entries (D), whereas a non-leaf level, e.g., level 0 or 1, may contain both data entries and index entries. Each index entry (I) at level N of the tree is configured to point to (reference) a metadata page 620 at level N+1 of the tree. Each level of the dense tree 600 also includes a header (e.g., level 0 header 630, level 1 header 640 and level 2 header 650) that contains per level information, such as reference counts associated with the extents. Each upper level header contains a header key (an extent key for the header, e.g., header key 632 of level 0 header 630) to a corresponding lower level header. A region key 662 to a root, e.g., level 0 header 630 (and top level 680), of the dense tree 600 is illustratively stored on-flash and maintained in a volume root extent, e.g., a volume superblock 660. Notably, the volume superblock 660 contains region keys to the roots of the dense tree metadata structures for all regions in a volume. Further, the header of each level 630, 640, 650 may include a magic number and checksum (not shown), which may be used for verifying the data structure as described later herein.

Dense Tree Volume Metadata Checkpointing

When a level of the dense tree 600 is full, volume metadata entries 446 of the level are merged with the next lower level of the dense tree. As part of the merge, new index entries (I) are created in the level to point to new lower level metadata pages 620, i.e., data entries from the level are merged (and pushed) to the lower level so that they may be "replaced" with an index reference in the level. The top level 680 (i.e., level 0) of the dense tree 600 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 600 is the ratio K of the size of level N−1 to the size of level N. Illustratively, the size of the array at level N is K times larger than the size of the array at level N−1, i.e., size of (level N)=K*size of (level N−1). After K merges from level N−1, level N becomes full (i.e., all entries from a new, fully-populated level N−1 are merged with level N, iterated K times.)

Figure 7:
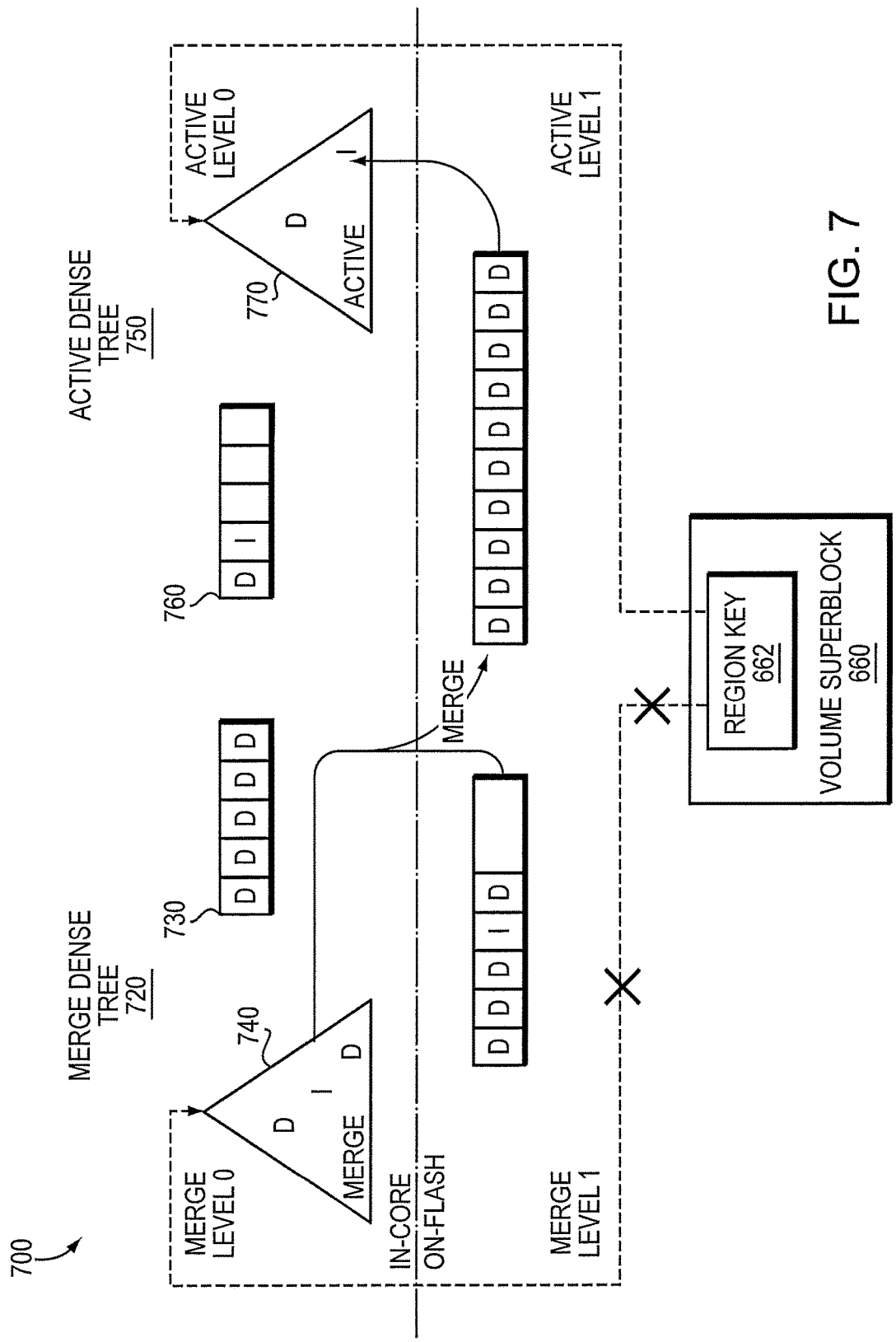
FIG. 7 illustrates merging between levels of the dense tree metadata structure.

FIG. 7 illustrates merging 700 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 720) that merges, while an alternate "active" dense tree structure (shown at 750) is utilized to accept incoming data. Accordingly, two in-core level 0 staging buffers 730, 760 are illustratively maintained for concurrent merge and active (write) operations, respectively. In other words, an active staging buffer 760 and active top level 770 of active dense tree 750 handle in-progress data flow (i.e., active user read and write requests), while a merge staging buffer 730 and merge top level 740 of merge dense tree 720 handle consistency of the data during a merge operation. That is, a "double buffer" arrangement may be used to handle the merge of data (i.e., entries in the level 0 of the dense tree) while processing active operations.

During the merge operation, the merge staging buffer 730, as well as the top level 740 and lower level array (e.g., merge level 1) are read-only and are not modified. The active staging buffer 760 is configured to accept the incoming (user) data, i.e., the volume metadata entries received from new put operations are loaded into the active staging buffer 760 and added to the top level 770 of the active dense tree 750. Illustratively, merging from level 0 to level 1 within the merge dense tree 720 results in creation of a new active level 1 for the active dense tree 750, i.e., the resulting merged level 1 from the merge dense tree is inserted as a new level 1 into the active dense tree. A new index entry I is computed to reference the new active level 1 and the new index entry I is loaded into the active staging buffer 760 (as well as in the active top level 770). Upon completion of the merge, the region key 662 of volume superblock 660 is updated to reference (point to) the root, e.g., active top level 770 and active level 0 header (not shown), of the active dense tree 750, thereby deleting (i.e., rendering inactive) merge level 0 and merge level 1 of the merge dense tree 720. The merge staging buffer 730 (and the top level 740 of the dense tree) thus becomes an empty inactive buffer until the next merge. The merge data structures (i.e., the merge dense tree 720 including staging buffer 730) may be maintained in-core and "swapped" as the active data structures at the next merge (i.e., "double buffered").

Figure 8:
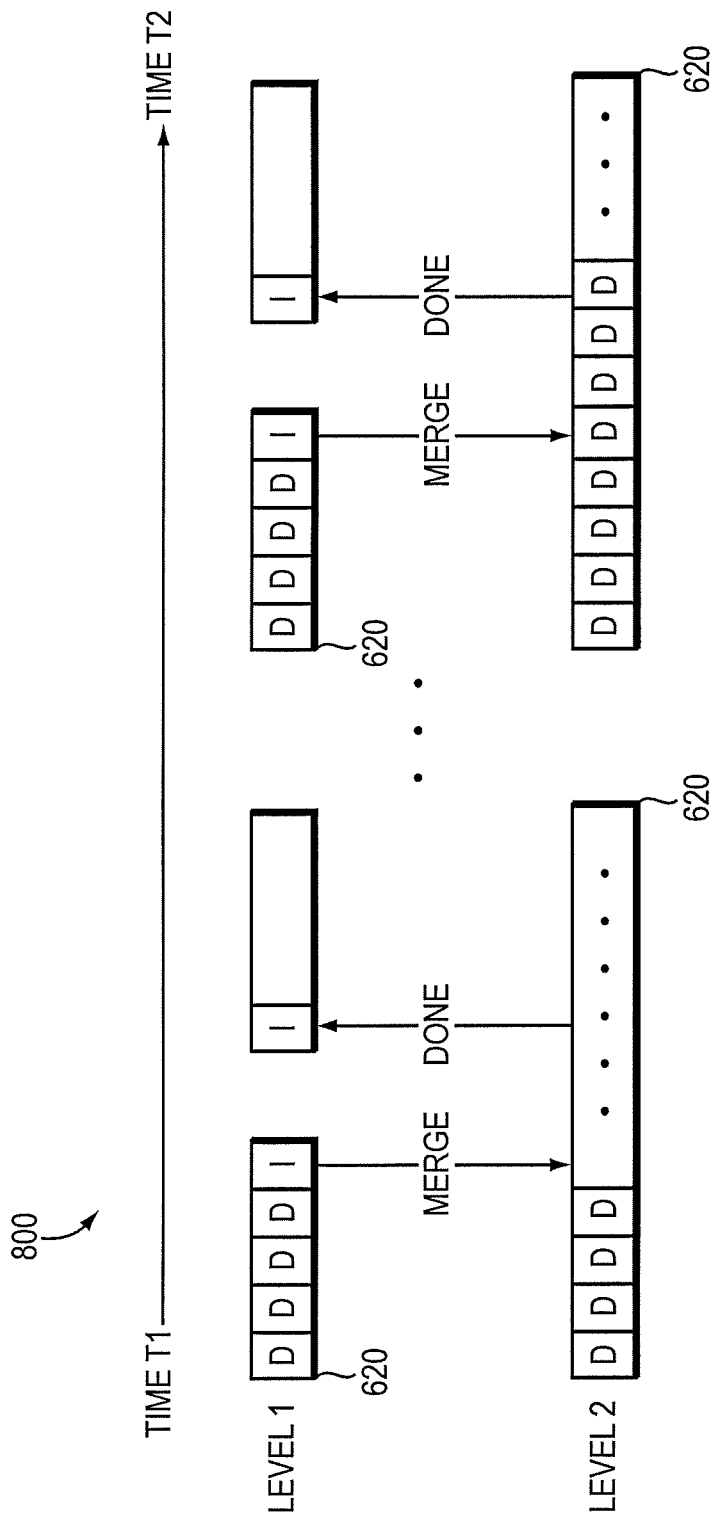
FIG. 8 illustrates batch updating between levels of the dense tree metadata structure.

FIG. 8 illustrates batch updating 800 between lower levels, e.g., levels 1 and 2, of is the dense tree metadata structure. Illustratively, as an example, a metadata page 620 of level 1 includes four data entries D and an index entry I referencing a metadata page 620 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Dense Tree Volume Metadata Logging

In an embodiment, the volume layer log 345 is a two level, append-only logging structure, wherein the first level is NVRAM 280 (embodied as NVLogs 285) and the second level is SSD 260, e.g., stored as extents. New volume metadata entries 446 inserted into level 0 of the dense tree are also recorded in the volume layer log 345 of NVLogs 285. When there are sufficient entries in the volume layer log 345, e.g., when the log 345 is full or exceeds a threshold, the volume metadata entries are flushed (written) from log 345 to SSD 260 as one or more extents 470. Multiple extents may be linked together with the volume superblock 660 holding a key (i.e., an extent key) to the head of the list. In the case of recovery, the volume layer log 345 is read back to memory 220 to reconstruct the in-core top level 680 (i.e., level 0) of dense tree 600. Other levels may be demand paged via the page cache 448, e.g., metadata pages of level 1 are loaded and read as needed.

Figure 9:
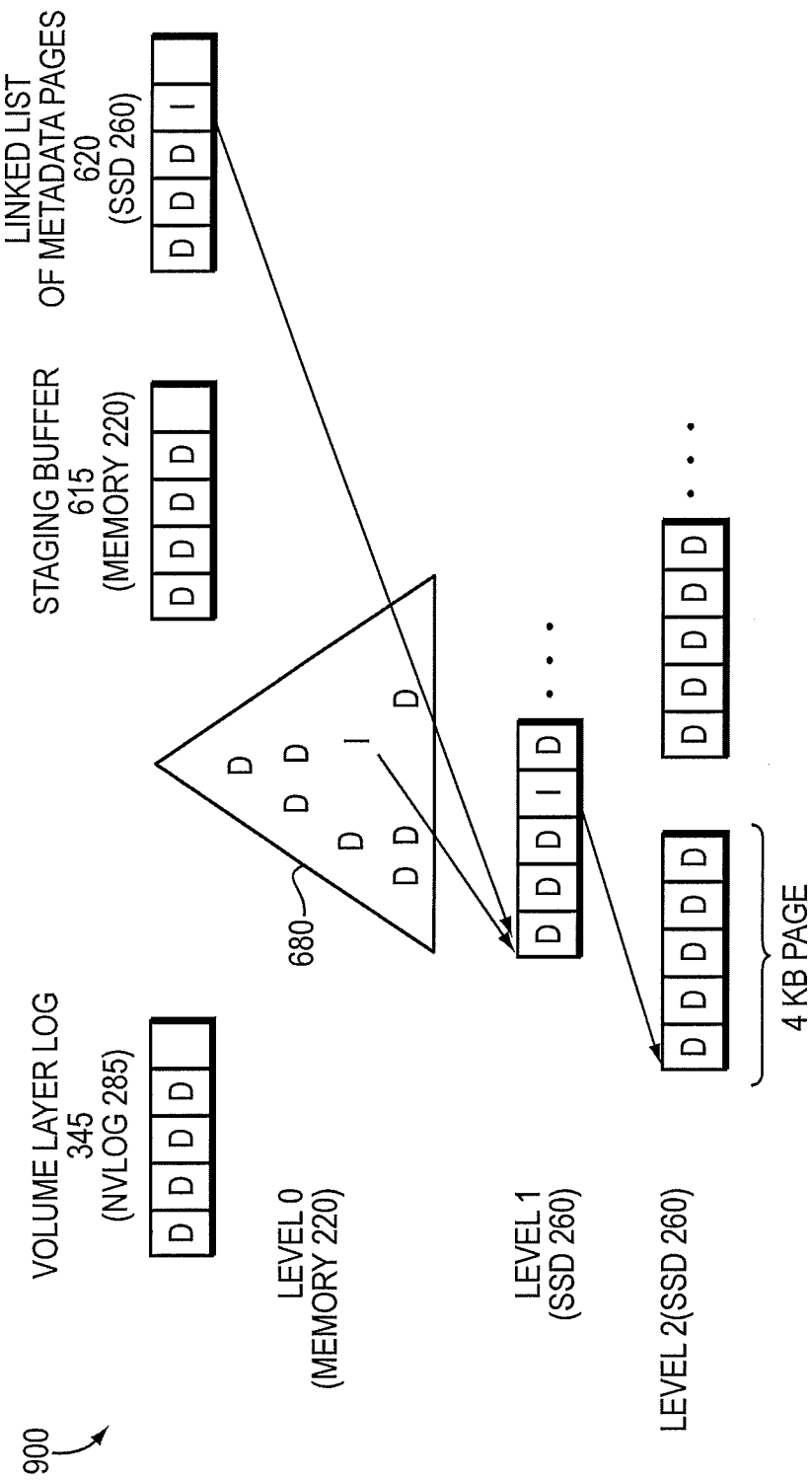
FIG. 9 illustrates volume logging of the dense tree metadata structure.

FIG. 9 illustrates volume logging 900 of the dense tree metadata structure. Copies of the volume metadata entries 446 stored in level 0 of the dense tree are maintained in persistent storage (SSD 260) and recorded as volume layer log 345 in, e.g., NVLogs 285. Specifically, the entries of level 0 are stored in the in-core staging buffer 615, logged in the append log (volume layer log 345) of NVLogs 285 and thereafter flushed to SSD 260 as a linked list of metadata pages 620. Copies of the level 0 volume metadata are maintained in-core as the active dense tree level 0 so as to service incoming read requests from memory 220. Illustratively, the in-core top level 680 (e.g., active dense tree level 0 770) may be used as a cache (for hot metadata), whereas the volume metadata stored on the other lower levels of the dense tree are accessed less frequently (cold data) and maintained on SSD. Alternatively, the lower levels also may be cached using the page cache 448.

Deferred Reference Count Update

In an embodiment, a deferred reference count update technique efficiently frees storage space for metadata (associated with data) to be deleted during a merge operation managed by the volume layer. As previously noted, the metadata is illustratively volume metadata embodied as mappings from LBAs of a LUN to extent keys maintained by the extent store layer. The volume layer organizes the volume metadata as a mapping data structure, i.e., a multi-level dense tree, where each level of the dense tree may include volume metadata entries for storing the volume metadata. Each level of the dense tree includes one or more metadata pages, each of which contains multiple volume metadata entries that provide the mappings from the host-accessible LBAs to the extent keys. Each metadata page is also stored as an extent and, thus, includes a page key (e.g., an extent key). When a level of the dense tree is full, the existing volume metadata entries of the level are merged with the next lower level of the dense tree. As part of the merge, new index entries are created in the level to point to new lower level metadata pages, i.e., data entries from the level are merged (and pushed) to the lower level so that they may be replaced with an index reference in the level. As a result, the existing (i.e., older) volume metadata entries of the level are no longer needed and, thus, are subject to deletion. That is, the metadata pages having the older (i.e., merged and no longer needed) volume metadata entries may be deleted. Notably, a merger of any entry in a metadata page renders that metadata page subject to deletion.

The extent store layer illustratively maintains a reference count on each key (e.g., page key or extent key); accordingly, a reference count (refcount) log may be employed to both delete (decrement) the refcount of the key and de-duplicate (increment) the refcount of the key. Note that refcount increments may occur as a result of volume metadata updates, such as overwrites and snapshot splitting. Illustratively, refcount increments may be processed during the merge operation, whereas refcount decrements (deletes) are deferred until the merge operation completes so as to permit simplified rollback and re-start of the merge operation. Note further that persistent storage of the page keys for deletion in the refcount log (as a separate, out-of-band data structure) enables low-overhead, i.e., does not consume much storage space on SSD when persisting the deletions in the refcount log.

In an embodiment snapshots and clones of volumes may be represented as independent volumes accessible by a host as LUNs, and embodied as respective read-only copies, i.e., snapshots, and read-write copies, i.e., clones, of the volume associated with the LBA range. Illustratively, each snapshot/clone may be derived from a dense tree of the parent volume (parent dense tree) to thereby enable fast and efficient snapshot/clone creation in terms of time and consumption of metadata storage space. To that end, portions (e.g., levels or volume metadata entries) of the parent dense tree may be shared with the snapshot/clone to support time and space efficiency of the snapshot/clone, i.e., portions of the parent volume divergent from the snapshot/clone volume are not shared. As used herein, volumes that share dense trees (or portions thereof) are members of a volume family (VF), and such VF members may use the same refcount log for shared dense trees (or portions thereof). Further, a level reference counter (refcount) (not shown) may be maintained for each level (i.e., portion) of the dense tree, illustratively within a respective level header 630, 640, 650 to track sharing of levels between the volumes (i.e., between the parent volume and snapshot/clone). Illustratively, the level refcount may increment when levels are shared and decremented when levels are split (e.g., copied). For example, a level refcount value of 1 may indicate an unshared level (i.e., portion) between the volumes (i.e., has only one reference). In an embodiment, volume metadata entries of a dense tree do not store data, but only reference data (as extents) stored on the storage array 150 (e.g., on SSDs 260). Consequently, more than one level of a dense tree may reference the same extent (data) even when the level refcount is 1. This may result from a split (i.e., copy) of a dense tree level brought about by creation of the snapshot/clone. Accordingly, a separate reference count is maintained for each extent in the extent store layer to track sharing of extents among volumes.

Figure 10:
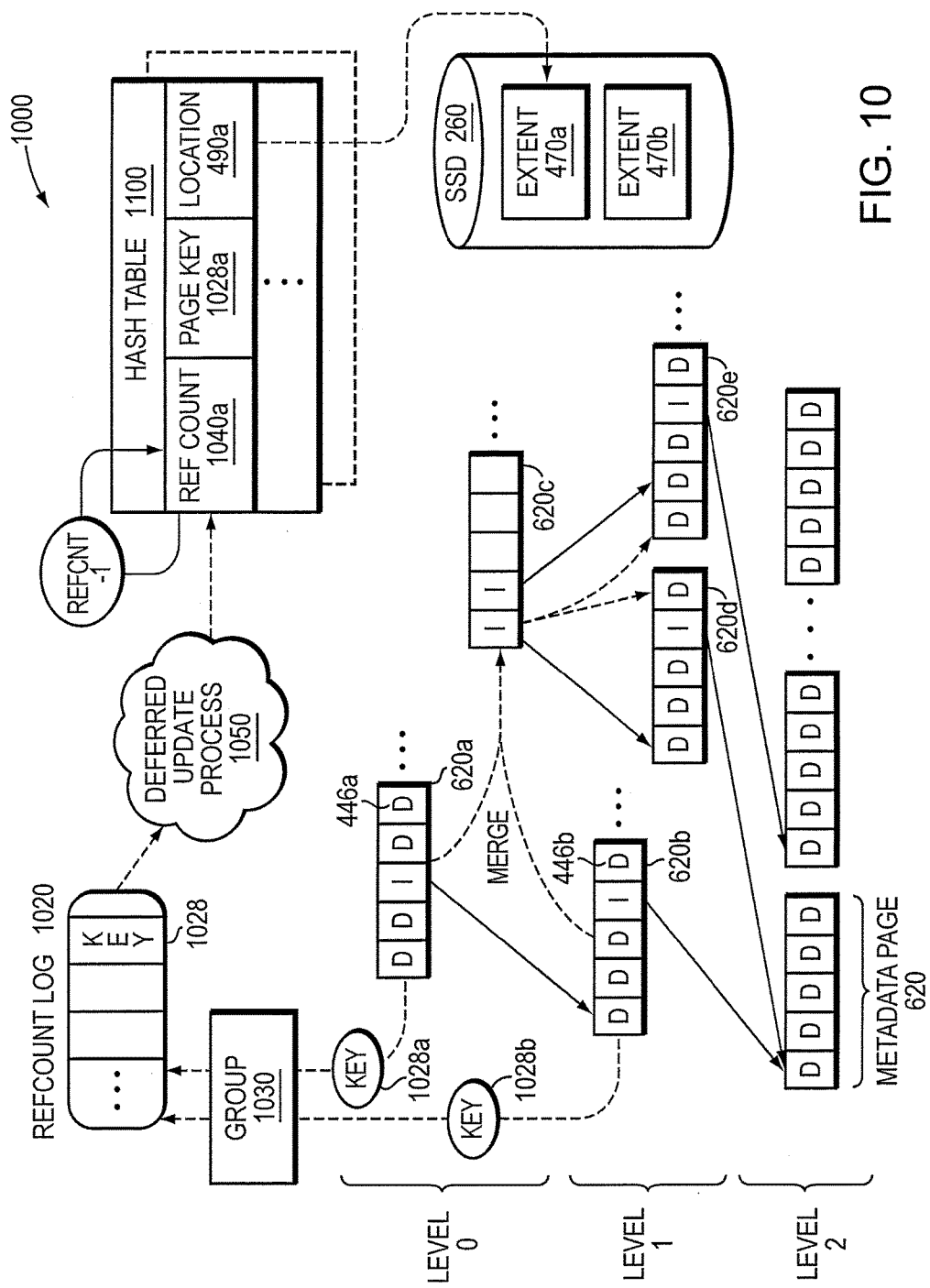
FIG. 10 illustrates a deferred reference count update technique.

FIG. 10 illustrates the deferred reference count update technique 1000 which may apply to deletion of the entire LUN or portion of the LUN, including overwrite of the LBA range (i.e., offset range) within the LUN, wherein one or more existing volume metadata entries 446 (i.e., LBA-to-extent key mappings) are deleted. According to the deferred reference count update technique, one or more requests to delete volume metadata entries 446a,b may be represented as page (metadata) keys 1028a,b associated with metadata pages 620a,b having those volume metadata entries during the merge operation. Accordingly, the storage space associated with those metadata pages may be freed in an out-of-band fashion (i.e., not during the merge). Illustratively, the page keys 1028a,b of the metadata pages 620a,b may be persistently recorded in a set of data structures embodied as a refcount log 1020 (e.g., a circular log) to thereby allow the merge operation to complete without resolving deletion (e.g., reference count reduction) of the keys (and, thus, freeing of the space of the extents 470a,b on SSD storing the metadata pages 620a,b associated with the page keys 1028a,b). Note that key deletion may occur when a reference count 1040a associated with the page key 1028a reduces to a sentinel value (e.g., zero).

A batch (i.e., group) of page keys 1030 (i.e., associated with the metadata pages 620a,b to be deleted) may be organized as one or more delete requests and inserted into the refcount log 1020 by the volume layer in a manner that maintains concurrency. During the merge operation, existing metadata pages 620a,b of, e.g., a top level (metadata page 620a) and a next level (metadata page 620b) of the dense tree may be deleted and rewritten as new metadata pages 620c,d,e. The page keys of the batch 1030 of the existing metadata pages 620a,b may be organized, e.g., in memory, as one or more pending delete requests. Note that the reference count log may support increments (i.e., duplicates), e.g., "make reference" (MKREF), of pages as well as decrements (i.e., deletion requests), e.g., "unreference" (UNREF). Once the merge operation completes, the page keys 1028a,b of the delete requests may be inserted into the refcount log. That is, batches of one or more keys may be inserted into the refcount log per batch on a key-by-key basis. Subsequently, a deferred reference count update process 1050 may be spawned (instantiated) to "walk" through the page keys stored in the refcount log and delete (i.e., reference count reduce) each key, e.g., from the extent store layer 350, independently and out-of-band from the merge operation. Note also that only the key is needed for deletion in the extent store layer which need only dereference (i.e., dissociate) the key with the extent. Illustratively, the extent store layer may effect deletion (e.g., reference count of zero) for each key by clearing a corresponding entry in the hash table 1100, thereby dereferencing the extent (e.g., 470a) storing the metadata page (e.g., 620a) associated with the key (e.g., 1028a). Note further that locations of identical metadata pages (e.g., during restart of a merge operation) may also directly replace locations 490 in the hash tables 1100 associated with prior metadata pages and avoid extent hashing 474 (i.e., avoid hashing again the identical metadata page).

Cuckoo Hashing

Figure 11:
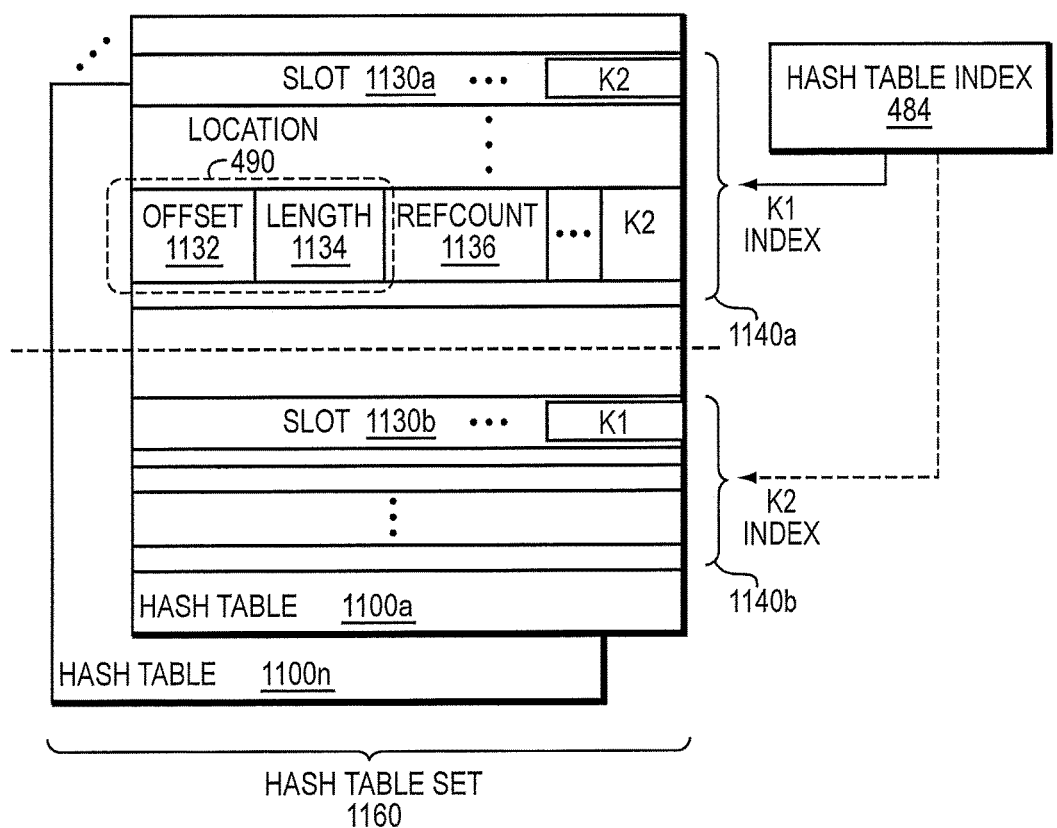
FIG. 11 is a block diagram of a cuckoo hash table.

In an embodiment, hashing may be used in a file system metadata arrangement that reduces an amount of metadata stored in the memory of a node in the cluster and that reduces the amount of metadata needed to process an I/O request at the node. Illustratively, the embodiments include cuckoo hashing and, in particular, a manner in which cuckoo hashing may be modified and applied to construct the file system metadata arrangement. In an embodiment, the file system metadata arrangement may be illustratively configured as a key-value extent store embodied as a data structure, e.g., a cuckoo hash table. FIG. 11 is a block diagram of a cuckoo hash table 1100 that may be advantageously used with one or more embodiments described herein. Illustratively, the extent metadata resides entirely in the memory 220 of each node 200 and is embodied as a hash table 1100a-n of a set of hash tables 1160 configured to address locations of the SSD. In an embodiment, there are illustratively 768 (3×256) hash tables in the hash table set 1160, wherein each hash table 1100 has a same size. A value, such as a hash table index 484, may be applied to the cuckoo hash table to obtain a key, such as an extent key 475, configured to reference a location 490 of an extent 470 on one or more storage devices, such as SSDs 260. Thus, the cuckoo hash table 1100 embodies extent metadata that describes the extent and, as such, may be organized to associate a location on SSD with an index, i.e., a value associated with the hash table index 484 identifies the location on SSD. Advantageously, the file system metadata arrangement achieves a high degree of metadata compactness, thus reducing read and write amplification as well as memory requirements.

In an embodiment, storage and retrieval of key-value pairs employ cuckoo hashing, i.e., the set of cuckoo hash tables, using a portion of the hash value 472 as the hash table index 484 (i.e., indexing into the cuckoo hash table), which key is illustratively split in half. Each half of the hash table index may be used as an index into each cuckoo hash table 1100 to determine a potential entry for storing the other half of the hash table index in the table. That is, one half of the hash table index 484 may be used as the index into the cuckoo hash table, while the other half may be used as the value stored in the hash table 1100. Alternatively, the other half of the hash table index may be used as the index, while the one half may be used as the stored value. Thus, the same hash table sindex 484 can be stored in the cuckoo hash table in two different ways, i.e., either in an upper half or lower half of the cuckoo hash table 1100. This allows higher population, i.e., load factor, in the hash table without chaining, e.g., the use of linked lists, by accessing an entry with the one half of the hash table index as the index and, if the entry is occupied, accessing another entry with the other half of the hash table index as the index. Accordingly, cuckoo hashing reduces an amount of metadata (i.e., the hash table index) stored in the memory of the node as a result of a higher load factor. If both entries are occupied, then one of the two entries is chosen and the prior content of the entry may be evicted and re-inserted into the cuckoo table at an alternate location (i.e., alternate entry) using the prior content as an alternate index to the hash table, i.e., not resolving to either of the two entries. The hash table index 484, i.e., referencing the chosen entry, may then be stored at the alternate location. If the alternate location also is occupied, the prior content of the alternate entry may also be evicted. This eviction process may be repeated until an unoccupied entry is found.

However, as full capacity (i.e., load) of the hash table 1100 is approached, a cycle effect may be realized wherein two or more entries chain together through their present and alternate hash table locations to form a complete cycle; if this occurs, no new insertions can occur at any of these locations. To eliminate this problem, the cuckoo hash table embodies a set associative organization such that, for each entry 1140 that is indexed by half of the hash table index 484, there is a plurality of possible slots 1130 (i.e., a group of slots associated with the index) into which the other half of the hash table index may be inserted/stored, i.e., all of the slots are associated with the indexing hash table index (i.e., the hash table index used to index the group of slots), but each slot 1130 may include a different other half of the hash table index 484. Illustratively, each slot 1130 includes an offset 1132 and a length 1134 which are organized to indicate a location on SSD for an extent "keyed" by the slot; a reference count ("refcount" 1136) indicating a number of metadata references to the extent; and either "K1" or "K2" not used as the hash table index 484 to index to the entry 1140. Generally, a free slot of the plurality of possible slots may be found by linear search of the plurality of slots for the non-indexing half of the hash table index, i.e., if K1 indexes for the entry/slot, a search for K2 is performed. Alternatively, the associative set may be sorted permitting a more efficient search, e.g., a binary search, to be used.

In an embodiment, the cuckoo hash table 1100 may be organized with a 32-way set associativity, i.e., the hash table index stored in the cuckoo hash table may be found in any of 32 slots of the hash table indexed at the one half of the hash table index or any of 32 slots indexed by the other half of the hash table index. If an adequately uniform hash function is used, the distribution may be sufficiently balanced such that there may be unoccupied slots 1130 for a given hash value. That is, as long as the entire hash table is not full, one of the 64 potential slots for the hash table index is likely to be unoccupied so that the hash table index can be inserted into that slot. If all 64 slots are occupied, it is likely that one of the 64 occupants can be moved to an empty entry/slot without any further relocation. Note that every time contents are moved from one entry/slot to another in the hash tables, the corresponding hash table index 484 may be logged to record changes to the hash table. Advantageously, the 32-way set associativity may provide a load factor greater than 98%, so that values inserted into the hash table remain in the slots/entries and are not pushed out by the cuckoo hashing until the table is substantially full. By using the cuckoo hash, two possible entries for an extent key in the hash table can be directly computed and the 64 slots associated with the entries can be inspected, i.e., searched, to find the extent key. Illustratively, entries of the cuckoo hash table may be sized so that all 32 slots for the hash table index fit in a cache line of the CPU 210 enabling a fast linear search of the slots.

Extent Metadata Logging

Figure 12A:
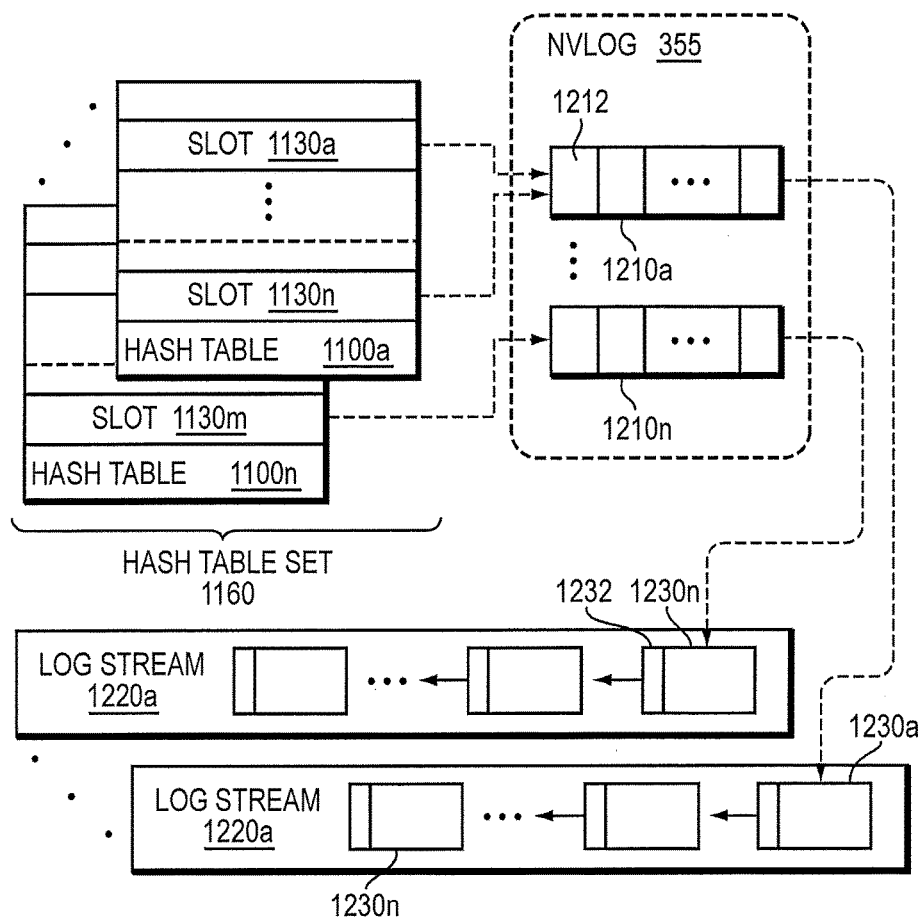
FIG. 12a is a block diagram of a hash table log stream.

FIG. 12a is a block diagram of a hash table log stream that may be advantageously used with one or more embodiments described herein. In an embodiment, changes to the set of hash tables 1160 are illustratively recorded as (e.g., appended to) a continuous stream of changes embodied as the extent store layer log 355 of the NVlogs 285. Illustratively, a separate log stream structure 1210 of the log 355 may be associated respectively with each hash table 1100 such that changed (i.e., dirtied) slots 1130 of the hash table are recorded as entries 1212 in the log stream structure 1210. That is, updates, i.e., changes, from the hash tables are stored in their corresponding log stream structures 1210 prior to storage on SSD. A copy (not shown) of the log stream structure 1210 may be stored in memory 220 (e.g., as an in-core buffer); in addition, previous contents of the log stream structure 1210 may be stored in a corresponding log stream 1220 on SSD. When the log stream structure 1210 grows large enough (e.g., to 8 KB) the in-core copy of the log stream structure 1210 may be written to its corresponding log stream 1220 (i.e., to SSD) as a log stream page 1230 (e.g., an 8 KB page update) in one operation, and a new in-core page may be created in memory 220 to receive further changes from the hash tables. Notably, the log stream structure 1210 may be implemented as a double buffer to accommodate writing to SSD (i.e., log stream 1220) while also recording entries 1212 to the log stream structure. The entries 1212 in the log stream structure 1210 may thereafter be discarded once it is confirmed that the corresponding page, i.e., log stream page 1230, is safely written to SSD. Notably, the log stream 1220*a-n*, i.e., log stream pages 1230*a-n*, may be stored as extents of the extent store instance being logged without relying on that extent store instance's metadata, i.e., without using slots in the hash tables of that extent store instance to locate the log stream pages. Instead, a separate location mechanism may be used to locate the log stream pages. Illustratively, each log stream page 1230 may include a pointer 1232 indicating the location of a previous log stream page on SSD, i.e., reverse chronological order. Alternatively, the log stream pages may be located via an indexing structure (e.g., organizing the log in reverse chronological order) stored in the log stream 1220, e.g., at a known offset, such as at a log stream beginning.

In an embodiment, there may be 256 log streams, which number is illustratively determined based on the time needed for a node 200 to reboot. That is, given a reboot time threshold, e.g., one second, the number of log streams is determined so that the node may begin servicing requests from the volume layer within the reboot time threshold (i.e., a reboot time to service). During reboot, if there are too few log streams (e.g., too many log stream pages associated with each log stream), the aggregate log read rate may be inadequate, because it is desirable that the node be able to serially access each of the log streams. As a result, the node may not be able to meet the reboot time to service. Accordingly, an adequate number of log streams 1220 may be needed, e.g., spread across the SSDs, so that an aggregate read bandwidth of the SSDs is sufficient to meet the reboot time to service. It should be noted that the metadata, i.e., the hash table slots 830*a-n*, are approximately evenly distributed via the extent hashing technique 474, so that no log stream exceeds twice the average log stream size, which provides for evenly distributed read requests among the log streams during reboot to facilitate a low reboot time to service. Further, adequate available cluster resources may also permit multiple hash tables 1100 to be associated with each log stream 1220 as described by an expansion technique in U.S. Pat. No. 8,996,535 titled Extent Hash Structure for Distributed Storage Architecture, to Kimmel et al. issued Mar. 31, 2015 (e.g., increasing the number of hash tables associated with each log stream by three, so that tables 0-2 may map to the first log stream, tables 3-5 may map to the second log stream, etc.).

Figure 12B:
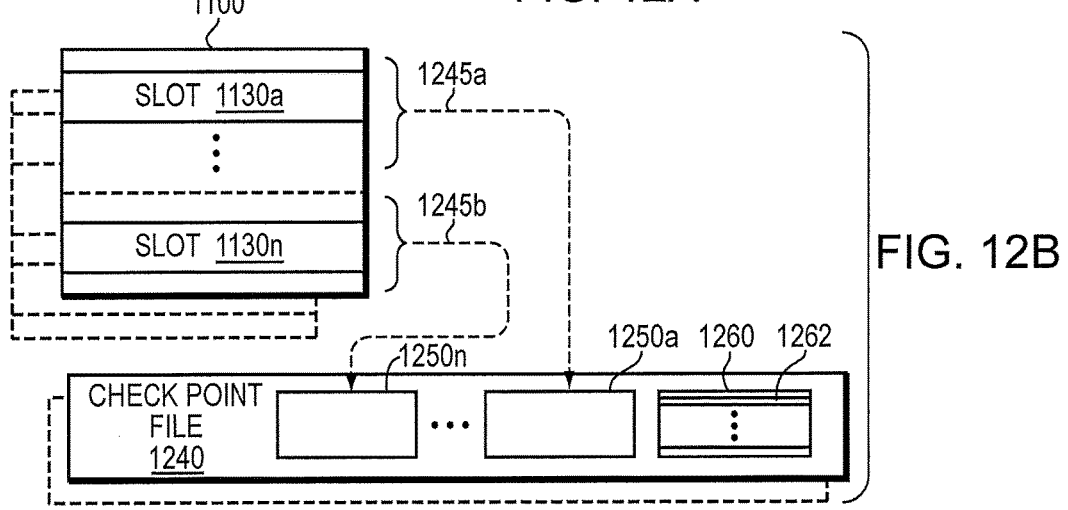
FIG. 12b is a block diagram of a hash table checkpoint file.

Organizing the log streams and hash tables in this fashion may provide locality of reference, so that all of the log entries 1212 in the log stream structures 1210*a-n* for each hash table may be directed to a respective single log stream 1220. Thus, a checkpoint of the metadata in each hash table, i.e., the slots 1130*a-n*, may be stored in a respective checkpoint file associated with that log stream. FIG. 12*b* is a block diagram of a hash table checkpoint file 1240 that may be advantageously used with one or more embodiments described herein. Slots 1130 of the hash table 1100 may be formed into groups 1245 and written as checkpoint having one or more checkpoint pages 1250 within the checkpoint file 1240. The checkpoint pages 1250 and log stream pages 1230 may include the same number of hash table slots and, thus, be of a same size, e.g., 8 KB. In this manner both logging and checkpointing of each hash table are independent of one another. Accordingly, the hash tables (and updates) may be segregated so that when a hash table (or group of hash tables) is associated with a particular CPU or thread of execution (i.e., each hash table has a processor affinity) no complicated locking is necessary to ensure the safety of multi-processing algorithms. For example, CPU 1 may be assigned hash tables 1-10, CPU 2 may be assigned tables 11-20, etc. Thus, an I/O request that is directed to hash table 1 may be processed by CPU 1 every time, so that there is no need for multiprocessor locking in order to achieve high throughput in a multiprocessing environment.

As with the log stream pages 1230 of the log streams, the checkpoint pages 1250 may be stored as extents of the extent store instance being logged without relying on that extent store instance's metadata, i.e., without using slots in the hash tables of that extent store instance to locate the checkpoint pages on SSD. Illustratively, an index table 1260 having index entries 1262 are stored in the checkpoint file 1240, e.g., at a known offset. The index entries 1262 may locate, e.g., as offsets, the checkpoint pages 1250 in the checkpoint file 1240. In alternate embodiments, the checkpoint may include any number of hash tables up to the entire in-core hash table set 1160.

Exactly Once Semantics (EOS) System

Figure 13:
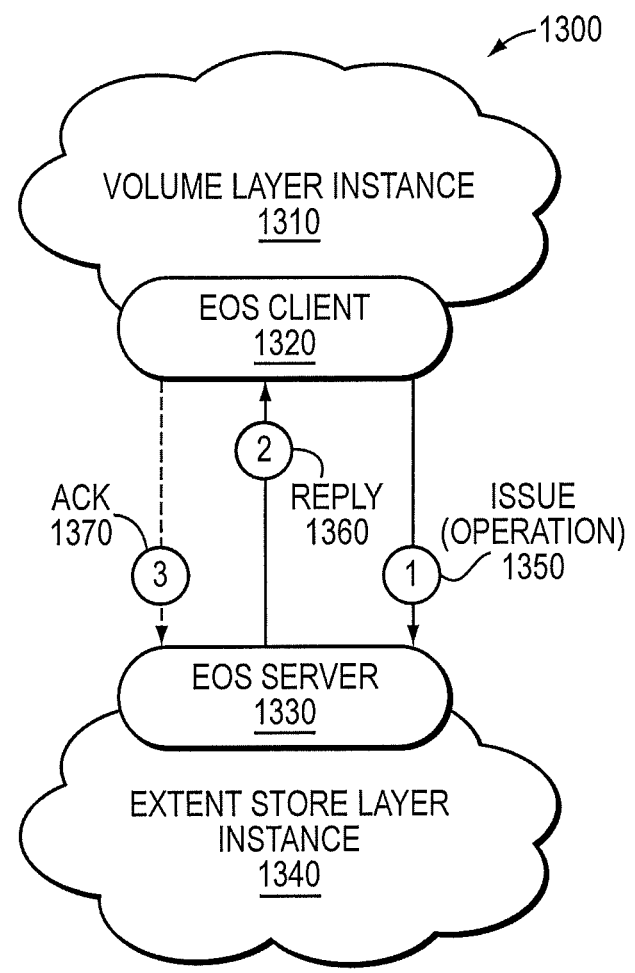
FIG. 13 is a block diagram of an exactly once semantics (EOS) system that may be advantageously used with one or more embodiments described herein.

In an embodiment, an exactly once semantics (EOS) system of the storage I/O stack implements a technique ensuring that non-idempotent operations occur exactly once in the storage system (i.e., within a node 200 of the cluster 100). FIG. 13 is a block diagram of the EOS system 1300 that may be advantageously used with one or more embodiments described herein. The EOS system 1300 is illustratively embodied as an EOS library (e.g., software module) having code sections associated with and executable by layers of the storage I/O stack 300. Illustratively, an instance of a first layer (e.g., a volume layer instance 1310) of the storage I/O stack 300 may execute a first portion of the EOS library and act as an EOS client 1320 issuing non-idempotent operations to an instance of a second layer (e.g., an extent store layer instance 1340) of the I/O stack, which may execute a second portion of the EOS library and act as an EOS server 1330. The EOS client 1320 may wrap (i.e., encapsulate) the non-idempotent operations within the transactions embodied as EOS transaction data structures, each having a transaction identifier (ID) that uniquely identifies the transaction. Illustratively, the EOS client 1320 may issue the operations (issue 1350) to the server. Upon servicing (i.e., completing) the operation, EOS server 1330 may return a reply 1360 with results of that issued operation to the EOS client 1320, which may then acknowledge (ack 1370) the reply, thus forming a three-way handshake as a life-cycle of the transaction.

Figure 14:
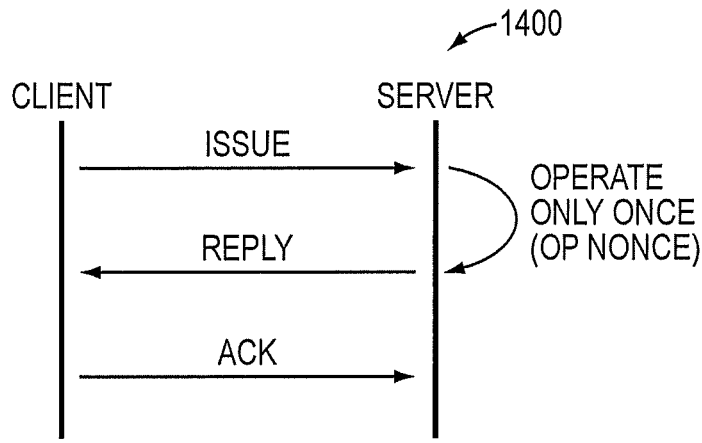
FIG. 14 illustrates a three-way handshake involving an EOS transaction.

FIG. 14 illustrates a three-way handshake involving an EOS transaction. Illustratively, the three-way handshake 1400 involves sending (i.e., issuing) a transaction, replying to the transaction, and acknowledging completion (i.e., servicing) of the transaction. In response to a crash (i.e., an unexpected interruption) and subsequent recovery of the node, the EOS system 1300 may determine whether the transaction completed prior to the crash. If so, the EOS system ensures that the transaction is not re-played (re-executed). Otherwise, the EOS system 1300 allows execution of the transaction such that the transaction (e.g., reference count increment) occurs exactly once (e.g., to accurately reflect a number of valid references to the extent). In this manner, exactly once semantics may be maintained between layers of the storage I/O stack, i.e., inter-layer EOS system, although an intra-layer EOS system may also be maintained separately within each layer.

Figure 15:
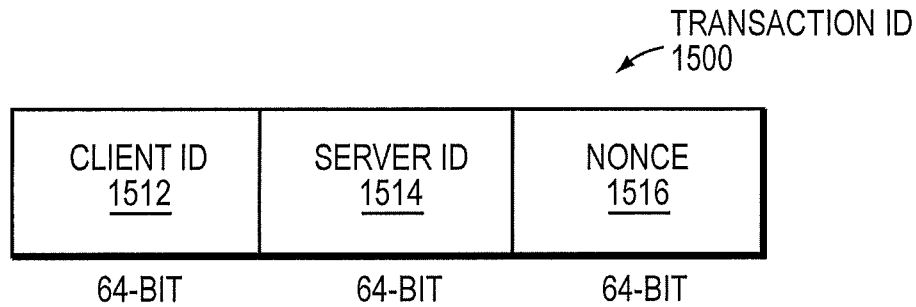
FIG. 15 is a block diagram of an EOS transaction identifier.

In an embodiment, the storage I/O stack 300 operating on each node 200 includes a number (e.g., 8) of volume layer instances 1310, each acting as an EOS client 1320, and a number (e.g., 768) of extent store layer instances 1340 (i.e., one per hash table), each acting as an EOS server 1330, wherein any EOS client on a node 200 may issue a transaction to any EOS server on a same or a different node (i.e., any node in the cluster 100). As noted, each transaction is associated with an EOS transaction ID. FIG. 15 is a block diagram of an EOS transaction identifier 1500, which is illustratively a unique 3-tuple that includes (i) a 64-bit "nonce" 1516, (ii) a unique 64-bit client ID 1512 and (iii) a unique 64-bit server ID 1514. Note that the nonce 1516 need not be unique cluster wide. Rather the nonce is illustratively unique per client as a universally unique value per transaction, i.e., an operation nonce ("op nonce"), wherein the term "nonce" denotes a single use (i.e., "used only once"). Each EOS client 1320 may maintain an in-memory (in-core) counter for all transactions issued to any EOS server 1330; the op nonce may be generated, e.g., as a monotonically increasing value using the in-core counter (not shown). In response to recovery from a crash, the EOS client may issue a flush command to the EOS server to discard any op nonce that the server may persistently maintain (e.g. as a transaction in the EOS table 225) for the client (i.e., an implicit acknowledgement of all outstanding op nonces for the client). Thereafter the EOS client can restart op nonce generation by, e.g., resetting the in-core counter to a sentinel value (e.g., 1), wherein the server has no retained state of any op nonces for the client.

In an embodiment, the server and client ID assignments are deterministic across crashes and reboots. That is, the extent store layer persists the server IDs 1514 and client IDs 1512 for reuse upon crash and recovery, e.g., the same 768 server IDs may be reused (i.e., assigned to the same hash tables). However, the client IDs 1512 may be dynamically assigned (i.e., allocated) for the number of clients (e.g., volume layer instances) upon reboot after a flush command is issued to every EOS server by the EOS client. That is, the flush command permits a server to discard all transactions related to the EOS client issuing the flush, in essence forgetting that client. As a result, the associated client ID 1512 may be allocated anew (i.e., assigned) when all EOS servers 1330 having transactions related to that client ID are flushed. Illustratively, a clustered database (CDB) transaction (not shown) may occur when allocating a client ID 1512 or server ID 1514 to essentially increment the last allocated client or server ID. Note that the clients/server IDs may be allocated infrequently, e.g., the server IDs 1514 may be assigned (i.e., allocated) upon initialization (initial boot) of the node, whereas the client IDs 1512 may be dynamically allocated upon each subsequent boot of the node. Note also that the 768 server IDs may be allocated (sequentially) within one atomic CDB transaction.

However, it is inefficient for the EOS client 1320 to send a separate acknowledgement message (ack 1370) to the EOS server 1330 for each completed operation (request). Accordingly, the EOS client may "piggyback" (i.e., append) the acknowledgement for one or more previous requests on top of (i.e., along with) a subsequent request to the EOS server (i.e., the acknowledgement overlaps the commit phase of a previous transaction with the prepare phase of a subsequent transaction). For example, the EOS client 1320 may send a transaction request A to the EOS server 1330 and receive a transaction response A from the server. The EOS client may then piggyback an acknowledgement of the transaction response A along with a transaction request B that is subsequently sent to the EOS server. Upon receiving the acknowledgement of the transaction response A, the server may remove a reference (persistent state) relating to the transaction request A (i.e., reclaim storage used to record transaction request A). If the piggybacked acknowledgement is lost during a crash, the EOS client may complete its recovery by replaying all transactions which it persistently stored and notifying the EOS server that all other outstanding transactions for the client are acknowledged, thereby allowing the server to remove all persistent state related to those outstanding transactions (i.e., forget those transactions).

Figure 16:
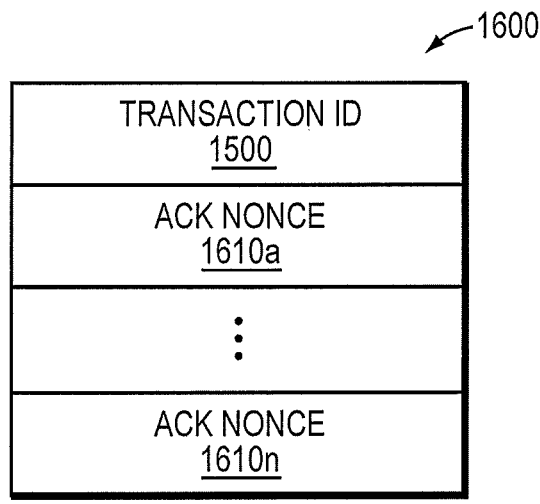
FIG. 16 is a block diagram of an EOS transaction data structure.

FIG. 16 is a block diagram of an EOS transaction data structure. The EOS transaction data structure 1600 may be appended to each transaction message exchanged between the EOS client 1320 and EOS server 1330 (e.g., volume and extent store layers respectively). The EOS structure 1600 may include the transaction ID 1500 (i.e., op nonce 1516, client ID 1512, and server ID 1514) as well as an array of one or more "ack nonce(s)" 1610a-n, which provide acknowledgement of prior response(s) received by the EOS client from the EOS server. Note that the value of each ack nonce 1610 may be qualified by the client ID and/or server ID tuple in the EOS structure. Note also that each transaction ID may not include the client ID and/or server ID tuple in the EOS structure for a transaction message when the EOS client and/or EOS server are identified a priori. Illustratively, the 4-tuple EOS structure (3-tuple transaction ID 1500 and at least one ack nonce 1610) is included in each message via the piggybacking mechanism described above.

In an embodiment, each instance of a layer (e.g., volume/extent store layer) may persistently record its own transactions in the appropriate NVLog (e.g., volume layer log 345 for the volume layer and extent store log 355 for the extent store layer). For example, the volume layer instance 1310 (EOS client 1320) may record (i.e., log) an intent to issue a put operation to the extent store layer instance 1340 (EOS server 1330) as in-process state using a transaction ID associated with that operation. The volume layer instance may log its transactions within entries of the NVLog and, when the NVLog is full, the transactions are seamlessly moved to SSD where they are persistently stored as described previously herein. Upon recovery from a crash, the volume layer instance 1310 (EOS client 1320) may examine the NVLog to determine any action needed to be performed (e.g., replay a logged operation).

Similarly, for the extent store layer instance 1340, a transaction commitment and actual change (e.g., to a reference count field of a hash table) may be atomically recorded in entries (i.e., transaction logs) of the NVLog via a direct memory access (DMA) write operation transfer to the NVRAM of the node executing the extent store instance 478. Further, the extent store layer instance may illustratively log the in-memory EOS table 225. In an embodiment, the transaction logs are similar to the extent store logging and checkpointing of the in-memory hash tables to enable recovery involving a crash. The transaction logs may be de-staged (when full) to SSD, which persists most of the logs used during replay. Illustratively, to prune the transaction logs from becoming too large, periodic checkpoints are employed, similar to fuzzy checkpointing previously described for the extent store (i.e., fuzzy checkpointing of the hash tables). Thus, the extent store logging and checkpointing approach described previously herein may be leveraged to log and checkpoint EOS transaction information for the extent store layer instance (i.e., EOS server). Upon recovery from a crash (i.e., an unexpected interruption), the extent store layer instance 1340 may examine the NVLog to determine any action need to be performed (e.g., execute a logged transaction).

In an embodiment, transactions may remain pending or "in-flight" once a checkpoint of the NVlog occurs, because the volume layer instance may not yet have acknowledged a reply for every transaction or even received the reply for every transaction from the EOS server. For example, assume the EOS client 1320 does not issue any new EOS transactions for a period of time. The EOS server 1330 may continue to log transaction replies (e.g., for lack of piggy-backing opportunity), which consume NVLog space that could be used by other EOS clients. Although the EOS server 1330 may attempt to increase NVlog space by reclaiming it from EOS clients, e.g., by broadcasting a message to all EOS clients informing them that NVLog space is getting full, the EOS clients may not have any space that they can free up. The EOS server may maintain state, e.g., via the in-memory EOS table 225, indicating which transactions are persistently stored on behalf of a client; however, the EOS server is unaware (i.e., lacks reply from the EOS client) of whether the EOS client has persistently stored (i.e., merged or checkpointed) the transactions and, thus, can free up the NVLog space consumed by those transactions.

As noted previously, the extent store layer instance 1340 (e.g., EOS server 1330) waits for the volume layer instance 1310 (e.g., EOS client 1320) to acknowledge the EOS transactions, before the extent store layer instance can forget (purge) the EOS transactions. That is, although fuzzy checkpointing may be applied to prune the extent store's memory of in-flight transactions, such checkpointing does not allow pruning of the extent store's knowledge of the EOS transactions, i.e., the exchange of information between the volume layer and extent store layer instances cannot be forgotten (purged) just because the extent store layer has checkpointed the transactions. That is, the extent store layer must wait until the volume layer acknowledges transaction, before purging those transactions from the extent store's storage resources (e.g., extent store NVlog and memory 220). Thus, the extent store layer alone cannot determine which transactions to purge. Rather the volume layer controls, e.g., using a flow control mechanism, when the extent store layer should purge transactions, so as to address the problem of running out of (exhausting) memory and NVLog space for the extent store when persisting transactions.

EOS Flow Control

The embodiments herein provide a flow control technique that prevents exhaustion of storage resources in the EOS system of the storage I/O stack. The EOS system 1300 illustratively implements the technique by providing flow control for an appropriate time to flush or purge the EOS transactions from the storage resources, based on parameters such as the amount of EOS server storage space (memory and NV log) that needs to be reclaimed and the impact on performance. From the perspective of the EOS server, the extent store layer instance 1340 has knowledge of the amount of its storage space used by all EOS clients (volume layer instances 1310). The flow control technique extends this perspective to allow each EOS client to "heuristically" anticipate consumption of the server resources (e.g., storage space) by individually limiting its own consumption of those resources. To that end, the EOS clients may keep track of the number of outstanding EOS transactions that can be purged by the EOS server and proactively inform the server to purge them (as opposed to the server waiting).

Figure 17:
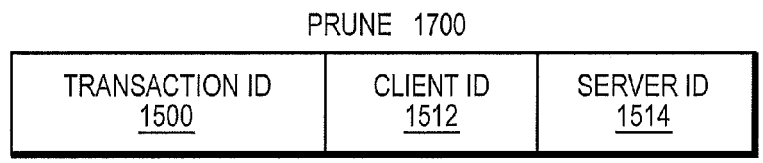
FIG. 17 is a block diagram of an EOS prune record.

FIG. 17 is a block diagram of an EOS prune record. In an embodiment, a checkpoint acknowledgement, e.g., a prune record 1700, may be issued to the EOS server after a periodic interval that marks the completion of all pending transactions issued prior to the record. Illustratively, the prune record 1700 is embodied as a special transaction record that includes a transaction ID 1500 of a most recently completed transaction, a server ID 1516 identifying the EOS server to which the prune record is directed, and a client ID 1720 identifying the client. Accordingly, upon receiving the prune record 1700, the EOS server may purge all logged transactions having transaction IDs earlier than that for the transaction ID 1500 in the prune record (i.e., transaction IDs with op nonce values less than the op nonce value of the transaction ID in the prune record).

Figure 18:
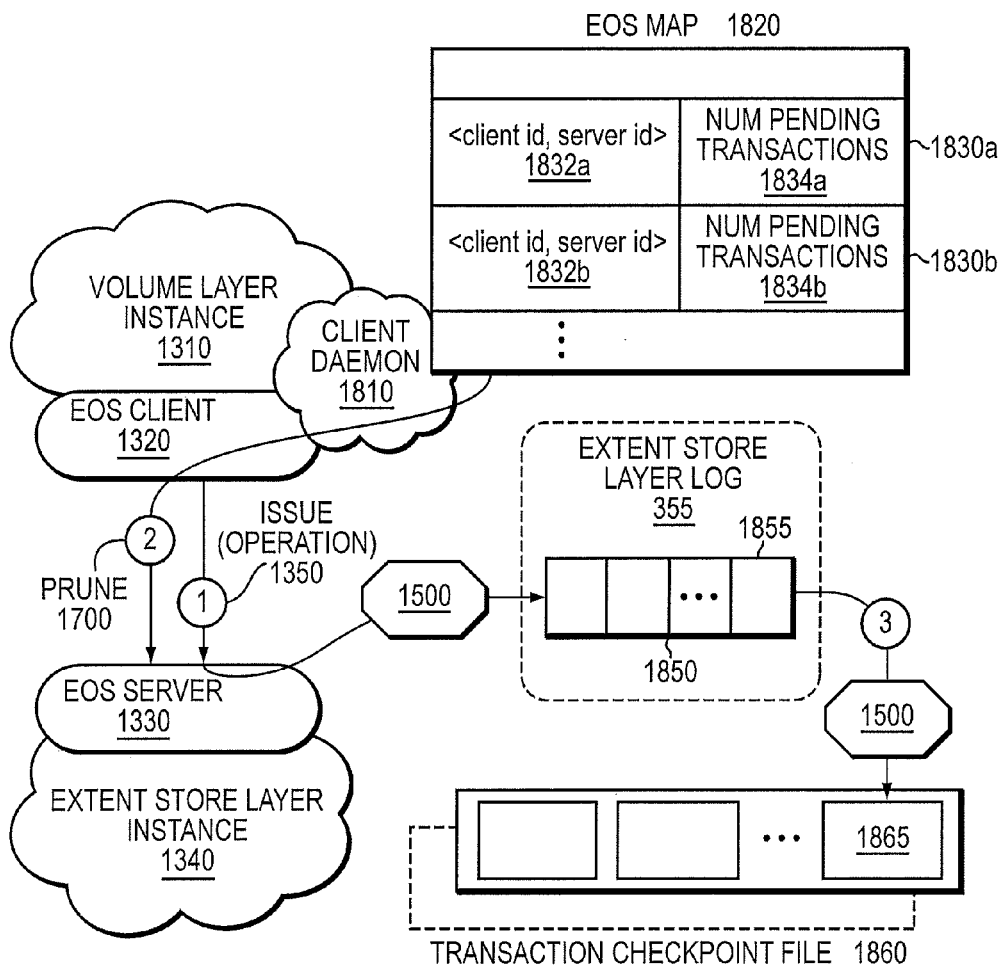
FIG. 18 illustrates logging and checkpointing of EOS transactions.

FIG. 18 illustrates logging and checkpointing of EOS transactions. In an embodiment, an EOS client daemon 1810 (e.g., executing a first portion of the EOS library) maintains an EOS map 1820 of EOS client/EOS server pairs (e.g., as a tuple client ID/server ID 1832*a,b*) wherein for each pair, the EOS client daemon 1810 tracks a number of pending transactions 1834*a,b* that have yet to be acknowledged to the EOS server. Note that the pending transactions may appear complete as seen by the EOS client, but as incomplete (i.e., pending) as seen by the EOS server until those transactions are acknowledged. Periodically, if the number of pending transactions 1834*a,b* exceeds a predetermined threshold value, the EOS client sends the prune record 1700 to the EOS server. Illustratively, the EOS map 1820 maintains pending transactions that include transactions 1) as yet un-replied by the server as well as 2) yet to be acknowledged by the EOS client. Accordingly, upon receiving the prune record, the EOS server 1330 may checkpoint to a transaction checkpoint file 1860 issued operations stored in the NVlogs (e.g., checkpoint entry 1855 in a transaction log 1850 of the extent store layer log 355) that are as yet un-replied by the EOS server or awaiting acknowledgment by the client. As such, the prune record 1700 operates as a purge of older (i.e., acknowledged) transactions and a checkpoint of still pending transactions, so as to free space from the NVLogs 285. Notably, the EOS server need only log (e.g., to the transaction log 1850) the prune record 1700 (rather than each pending transaction) to thereby prevent exhaustion of the storage resources (e.g., NVlogs 285 and memory 220), while also minimizing logging overhead of the server. In other words, receipt of the prune record by the EOS server may simply trigger a checkpoint of the transaction 1850 (including acknowledged transactions and the prune record) to the transaction checkpoint file 1860, thereby freeing storage resources (NVlog and memory). Note that the prune record is persistently stored (e.g., in the NVlog or the transaction checkpoint file), so that it may be used as a checkpoint marker (i.e., marking a point before which transactions are already acknowledged and thereby safely committed to storage).

In an embodiment, the threshold value is chosen so as to generate a low transaction backlog in the EOS server storage resources (e.g., memory and NVLog). That is, the chosen threshold value illustratively quantifies the number of pending transactions so as to avoid exhausting those EOS server resources for the pending (in-flight) transactions. That is, the threshold may be chosen so as to manage an amount of free space of the extent store layer log. Further, the threshold may be adjusted dynamically according to a write request pattern. Notably, the generated transaction backlog (i.e., purging and checkpointing in response to the purge record) not only prevents exhaustion/consumption of the server resources, but also reduces replay time as described herein. Thus, the flow control technique provides a performance and server storage resource reclamation enhancement to the EOS system 1300.

In order to replay the transactions during recovery from a crash, the EOS server, during normal operation, persistently stores (i.e., logs) the transactions (including the transaction ID) in the storage resources until an acknowledgement of completion is received from the EOS client for each pending transaction. In response to the crash, all in-flight transactions that have not been acknowledged by the EOS client are then replayed. According to the technique, the EOS server may utilize the prune records as checkpoint markers, so as to ignore those transactions that have already been acknowledged by the EOS client. Illustratively, the transactions that have been acknowledged may be identified by transaction IDs with op nonce values less than the op nonce value of the transaction ID in the prune record.

Advantageously, the flow control technique allows an EOS client to pace a frequency of acknowledgements to transaction replies issued by the EOS server to thereby purge pending (outstanding) transactions logged at EOS server storage based on information about the EOS client and performance (speed) of responses from the EOS server.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving a write request directed towards a storage container, the write request having data, the write request processed at a storage system having a memory and a processor, the storage system attached to a storage array;
   creating a first transaction at a client process of the storage system, the first transaction having an operation to store the data, the operation including a transaction identifier (ID);
   sending the first transaction to a server process of the storage system;
   incrementing a number of pending transactions;
   processing the first transaction at the server process, the first transaction stored to a first log maintained in the memory by the server process, wherein the data is stored on the storage array;
   sending a first reply for the first transaction from the server process to the client process;
   determining at the client process whether the number of pending transactions exceeds a threshold;
   in response to determining that the number of pending transactions exceeds the threshold, sending by the client process a second transaction to the server process, the second transaction including the transaction ID; and
   in response to receiving the second transaction at the server process, removing the first transaction from the first log and checkpointing un-replied and unacknowledged transactions in the first log to a checkpoint file stored on the storage array.

2. The method of claim 1 wherein the first transaction is stored to a second log on the storage array.

3. The method of claim 2, wherein the second transaction is stored to the second log on the storage array.

4. The method of claim 1 wherein the memory is a non-volatile random access memory.

5. The method of claim 1 further comprising:
   maintaining a map of pending transactions, the map having an entry for a client/server pair, the entry including the number of pending transactions, wherein the client/server pair includes a client identifier of the client process and a server identifier of the server process.

6. The method of claim 5, wherein the second transaction includes the client identifier and the server identifier.

7. The method of claim 1, wherein a third transaction is un-replied by the server process and stored to a second log on the storage array, the third transaction issued earlier than the second transaction, and wherein the second transaction is not stored to the second log.

8. The method of claim 7, further comprising:
   in response to a crash of the storage system, replaying the third transaction from the second log.

9. The method of claim 1 wherein the client process sends the second transaction after a periodic interval.

10. A method comprising:
    receiving a write request directed towards a storage container, the write request having data, the write request processed at a storage system having a memory and a processor, the storage system attached to a storage array;
    creating a first transaction at a client process of the storage system, the first transaction having an operation to store the data, the operation including a transaction identifier (ID);
    sending the first transaction to a server process of the storage system;
    incrementing a number of pending transactions;
    processing the first transaction at the server process, the first transaction stored to a first log maintained in the memory by the server process, wherein the data is stored on the storage array;
    sending a first reply for the first transaction from the server process to the client process;
    determining at the client process whether the number of pending transactions exceeds a threshold;
    in response to determining that the number of pending transactions exceeds the threshold, sending by the client process a second transaction to the server process, the second transaction including the transaction ID; and in response to receiving the second transaction at the server process, removing one or more earlier transactions from the first log and checkpointing un-replied and unacknowledged transactions in the first log to a checkpoint file stored on the storage array.

11. A system comprising:
a storage system having a memory connected to a processor;
a storage array coupled to the storage system;
a storage I/O stack executing on the processor of the storage system, the storage I/O stack configured to:
receive a write request directed towards a storage container, the write request having data and processed by the processor;
create a first transaction at a client process of the storage system, the first transaction having an operation to store the data, the operation including a transaction identifier (ID);
send the first transaction to a server process of the storage system;
increment a number of pending transactions;
process the first transaction at the server process, the first transaction stored to a first log maintained in the memory by the server process, wherein the data is stored on the storage array;
send a first reply for the first transaction from the server process to the client process;
determine at the client process whether the number of pending transactions exceeds a threshold;
in response to determining that the number of pending transactions exceeds the threshold, send by the client process a second transaction to the server process, the second transaction including the transaction ID; and
in response to receiving the second transaction, the server process, remove one or more earlier transactions from the first log and checkpoint un-replied and unacknowledged transactions in the first log to a checkpoint file stored on the storage array.

12. The system of claim 11 wherein the one or more earlier transactions are stored to a second log on the storage array.

13. The system of claim 12, wherein the second transaction is stored to the second log on the storage array.

14. The system of claim 12, wherein the storage I/O stack is further configured to:
store the second transaction to the second log; and
in response to a crash of the storage system, using the second transaction as a checkpoint marker to discard the one or more earlier transactions in the second log.

15. The system of claim 11 wherein the memory is a non-volatile random access memory.

16. The system of claim 11 wherein the storage I/O stack is further configured to:
maintain a map of pending transactions, the map having an entry for a client/server pair, the entry including the number of pending transactions, wherein the client/server pair includes a client identifier of the client process and a server identifier of the server process.

17. The system of claim 16 wherein the second transaction includes the client identifier and the server identifier.

18. The system of claim 11, wherein a third transaction is un-replied by the server process and stored to a second log on the storage array, the third transaction issued earlier than the second transaction.

19. The system of claim 18, wherein the storage I/O stack is further configured to:
in response to a crash of the storage system, replay the third transaction from the second log.

20. The system of claim 11 wherein the client process sends the second transaction after a periodic interval.

* * * * *